(12) United States Patent
Ohmori et al.

(10) Patent No.: US 7,927,755 B2
(45) Date of Patent: Apr. 19, 2011

(54) CERAMIC THIN PLATE MEMBER

(75) Inventors: Makoto Ohmori, Nagoya (JP); Natsumi Shimogawa, Nagoya (JP); Michihiro Asai, Nagoya (JP); Tsutomu Nanataki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1058 days.

(21) Appl. No.: 11/690,969

(22) Filed: Mar. 26, 2007

(65) Prior Publication Data

US 2007/0248869 A1  Oct. 25, 2007

(30) Foreign Application Priority Data

Apr. 24, 2006  (JP) .................................. 2006-119599
Oct. 24, 2006  (JP) .................................. 2006-288975
Jan. 31, 2007  (JP) .................................. 2007-020822

(51) Int. Cl.
 *H01M 2/20* (2006.01)
 *H01M 8/24* (2006.01)
 *H01M 8/10* (2006.01)
 *H01M 8/00* (2006.01)

(52) U.S. Cl. ........ 429/469; 429/479; 429/482; 429/483; 429/486; 429/535

(58) Field of Classification Search .................. 429/30, 429/34, 38, 39, 469, 479, 482, 483, 486, 429/535
See application file for complete search history.

(56) References Cited

U.S. PATENT DOCUMENTS

| 7,135,248 B2 * | 11/2006 | Finn et al. ................... 429/38 |
| 2002/0012825 A1 | 1/2002 | Sasahara et al. |
| 2003/0012994 A1 | 1/2003 | Kushibiki et al. |
| 2004/0161650 A1 | 8/2004 | Robert |
| 2005/0095483 A1 | 5/2005 | Song et al. |
| 2008/0050558 A1 * | 2/2008 | Ohmori et al. ............ 428/141 |

FOREIGN PATENT DOCUMENTS

| EP | 0 671 772 A1 | 9/1995 |
| EP | 1 619 736 A1 | 1/2006 |
| EP | 1 840 999 A2 | 10/2007 |
| JP | 2004-342584 A1 | 12/2004 |
| WO | 02/089243 A2 | 11/2002 |

* cited by examiner

*Primary Examiner* — Patrick Ryan
*Assistant Examiner* — Julian Mercado
(74) *Attorney, Agent, or Firm* — Burr & Brown

(57) ABSTRACT

A thin plate member is a thin plate member that is formed by sintering, contains a ceramic layer, and comprises a thin part having two or more types of layers laminated, each of which is made of a material having a different thermal expansion coefficient, and a thick part that is made by laminating plural layers including at least all of the layers constituting the thin part, and has a thickness greater than the thickness of the thin part. The thin part has a shape warping in the direction perpendicular to the plane of the thin plate member. By virtue of this configuration, the internal electrical resistance of the thin part can be reduced. Further, the thin plate member can be provided that is difficult to be deformed with respect to the internal stress caused by the difference in thermal expansion coefficient between layers.

21 Claims, 31 Drawing Sheets

FIG.30

| | Thin part | Thick part | | | Difference of thickness | Warp on thin part | Warping amount of substrate | Result |
|---|---|---|---|---|---|---|---|---|
| | Thickness of air electrode layer | Thickness of electrolyte layer | Thickness of fuel electrode layer | Thickness of warp correction layer | | | | |
| Standard 1 | 1um | 1um | 1um | 10um | 10um | Unmeasurable | Unmeasurable | Crack is produced all over the substrate |
| Standard 2 | 1um | 3um | 1um | 10um | 10um | 1um | 30um | Satisfactory |
| Standard 3 | 2um | 3um | 5um | 10um | 10um | 1um | 150um | Satisfactory |
| Standard 4 | 3um | 10um | 3um | 15um | 15um | 5um | 70um | Satisfactory |
| Standard 5 | 5um | 20um | 5um | 20um | 20um | 22um | 220um | Satisfactory |
| Standard 6 | 5um | 35um | 5um | 20um | 20um | 15um | 180um | Satisfactory |
| Standard 7 | 15um | 35um | 20um | 50um | 50um | 20um | 250um | Satisfactory |
| Standard 8 | 20um | 50um | 15um | 35um | 35um | 35um | 135um | Satisfactory |
| Standard 9 | 20um | 50um | 30um | 20um | 20um | 25um | 300um | Satisfactory |
| Standard 10 | 20um | 5um | 20um | 100um | 100um | 62um | 260um | Satisfactory |
| Standard 11 | 10um | 3um | 20um | 200um | 200um | 85um | 280um | Satisfactory |
| Standard 12 | 10um | 1um | 20um | 300um | 300um | 100um | 250um | Satisfactory |
| Standard 13 | 20um | 20um | 30um | 400um | 400um | Unmeasurable | more than 500um | Crack is produced on thin part |
| Standard 14 | 5um | 5um | 10um | 300um | 300um | Unmeasurable | more than 500um | Crack is produced on thin part |

CERAMIC THIN PLATE MEMBER

BACKGROUND OF THE INVENTION

1. Field of the Invention

The present invention relates to a sintered thin plate member containing a ceramic layer, wherein two or more types of layers, each layer being made of a material having a different thermal expansion coefficient, are laminated.

2. Description of the Related Art

Conventionally, a sintered thin plate member containing a ceramic layer and having two or more types of layers laminated, each of which is made of a material having a different thermal expansion coefficient, has been used for various apparatuses such as a sensor, actuator, unit cell of a solid oxide fuel cell (SOFC), etc. (see Japanese Unexamined Patent Application No. 2004-342584).

The thin plate member used for these apparatuses is extremely thin in order to achieve an object to downsize an apparatus, to reduce an internal electrical resistance and other objects. Therefore, the sintered thin plate member is easily deformed due to an internal stress (thermal stress) caused by the difference in the thermal expansion coefficient between the layers. Further, it may sometimes be deformed due to the occurrence of internal stress (thermal stress) caused by the difference in the shrinkage amount during the sintering. Any deformation of this type of the thin plate member causes various problems.

For example, when this type of the thin plate member is used as a unit cell of an SOFC in which a solid electrolyte layer is used as a ceramic layer, the thin plate member may be deformed when the thickness of the solid electrolyte layer is reduced in order to decrease the internal electrical resistance in the solid electrolyte layer in a cell structure supported by an electrolyte layer. Since a fuel flow path or air flow path formed at the portion opposite to the thin plate member is extremely narrow, a potential problem that the deformed thin plate member might close these flow paths could arise. Even if the thin plate member is deformed to such a degree that does not fully close the flow paths, there arises a problem that the pressure loss may be produced when fluid such as air or fuel flowing through the flow paths increases due to any deformation occurring in the thin plate member.

SUMMARY OF THE INVENTION

Accordingly, an object of the present invention is to provide a sintered thin plate member that is difficult to be deformed by an internal stress caused by a difference in thermal expansion coefficient between layers, while ensuring a relatively thin portion.

In order to achieve the aforesaid object, a thin plate member according to the present invention is a thin plate member that is formed by sintering, contains at least a ceramic layer, and has two or more types of layers laminated, each of which is made of a material having a different thermal expansion coefficient.

The thin plate member comprises (a plurality of) a thin part that is a portion (a part) of the thin plate member, and a thick part that is a portion (remaining portion, the other part) of the thin plate member, and has a thickness greater than the thickness of the thin part formed by laminating plural layers including all of the layers constituting at least the thin part. Specifically, the thick part is a portion in which only all of the layers constituting the thin part are laminated, or a portion in which an additional layer is laminated on all of the layers constituting the thin part. The thin part of the thin plate member has a shape warping in the direction perpendicular to the plane of the thin plate member.

By virtue of this configuration, the thin portion can be ensured since the thin plate member has the thin part, whereby the objects of downsizing an apparatus and reducing an internal electrical resistance can be achieved. Since the thin plate member has a thick part, a bending resistance of the thick body in the thin plate member increases, with the result that the overall thin plate member is difficult to be deformed by the internal stress caused by the difference in thermal expansion coefficient between layers. Since the thin part is separated by the thick part, and an orthogonal projection area of each thin part in the direction perpendicular to the plane of the thin plate member is reduced, the deformation amount of each thin part can be reduced, whereby the deformation amount of the entire thin plate member can be reduced.

Additionally, the present inventors have succeeded in forming the thin part into a shape warped in the direction perpendicular to the plane of the thin plate member. Further, the present inventors have found that the whole thin plate member becomes more difficult to be deformed by the internal stress caused by the difference in thermal expansion coefficient between layers by forming the thin part of the thin plate member into a shape warped in the direction perpendicular to the plane of the thin plate member. Thus, the present invention can provide a thin plate member that is greatly difficult to be deformed by the internal stress caused by the difference in thermal expansion coefficient between layers by providing a thick part and forming a warp on the thin part.

In the thin plate member, it is preferable that the thickness of the thin part is not less than 5 μm and not more than 100 μm, and the difference between the thickness of the thick part and the thickness of the thin part is not less than 10 μm and not more than 300 μm. By virtue of this configuration, the thin part is extremely thin, whereby the object of downsizing an apparatus, reducing the internal electrical resistance can be achieved. Further, since the thick part can be sufficiently increased, it has been found that the whole thin plate member is difficult to be deformed by the internal stress caused by the difference in thermal expansion coefficient provided between layers.

Moreover, when one or more thin parts are provided in the thin plate member, and the orthogonal projection area of each thin part in the direction perpendicular to the plane of the thin plate member is not less than 1 mm$^2$ and not more than 100 mm$^2$ (e.g., when the orthogonal projection shape of each thin part is circular, elliptic, square, or rectangular, and the diameter of the circle, the major axis of the ellipse, the length of one side of the square, or the length of the long side of the rectangle is not less than 1 mm and not more than 10 mm), it is preferable that the height of the warp of the thin part in the direction perpendicular to the plane is not less than 1 μm and not more than 100 μm. It has been found that, according to this configuration, the effect of preventing the deformation of the whole thin plate member brought by the formation of the warp on the thin part is remarkably enhanced. When the thin part is extremely thin, such as not less than 5 μm and not more than 100 μm as described above, the warp on the thin part (more preferably, the warp with a height of not less than 1 μm and not more than 100 μm) can naturally be formed during the process of forming the thin plate member by sintering.

Moreover, when one or more thin parts are provided in the thin plate member, and the orthogonal projection area of each thin part in the direction perpendicular to the plane of the thin plate member is not less than 1 mm$^2$ and not more than 100 mm$^2$ (e.g., when the orthogonal projection shape of each thin part is circular, elliptic, square, or rectangular, and the diameter of the circle, the major axis of the ellipse, the length of one side of the square, or the length of the long side of the rectangle is not less than 1 mm and not more than 10 mm), it is preferable that the height of the warp of the thin part in the direction perpendicular to the plane is not less than 1 µm and not more than 100 µm. It has been found that, according to this configuration, the effect of preventing the deformation of the whole thin plate member brought by the formation of the warp on the thin part is remarkably enhanced. When the thin part is extremely thin, such as not more than 5 µm and not less than 100 µm as described above, the warp on the thin part (more preferably, the warp with a height of not less than 1 µm and not more than 100 µm) can naturally be formed during the process of forming the thin plate member by sintering.

It is preferable that the ratio of the orthogonal projection area of the thick part to the orthogonal projection area of the whole thin plate member in the direction perpendicular to the plane of the thin plate member is 5% or more. It has been found that, according to this configuration, the effect of preventing the deformation of the whole thin plate member brought by the formation of the thick part is remarkably enhanced. Examples of the orthogonal projection shape of the thick part in the direction perpendicular to the plane of the thin plate member include stripe, lattice, or the like.

When this thin plate member is used as a unit cell for an SOFC, the thin part and the thick part comprises, for example, (only) a solid electrolyte layer as the ceramic layer, a fuel electrode layer formed on one surface of the solid electrolyte layer and an air electrode layer formed on the other surface of the solid electrolyte layer, wherein the thickness of any one of the layers in the thick part is greater than the thickness of the corresponding layer in the thin part. The thickness of the other layers may be the same or different from each other between the thick part and the thin part.

Specifically, for example, the thickness of the solid electrolyte layer in the thick part is greater than the thickness of the solid electrolyte layer in the thin part, whereby the thin plate member can be formed in which the thickness of the thick part is greater than the thickness of the thin part. It is preferable that the difference between the thickness of the solid electrolyte layer in the thick part and the thickness of the solid electrolyte layer in the thin part is not less than 10 µm and not more than 300 µm.

By virtue of this configuration, the solid electrolyte layer in the thin part can be made extremely thin, whereby the internal electrical resistance of the whole electrolyte layer can be reduced. Additionally, the solid electrolyte layer in the thick part can be made sufficiently thick, so that the whole solid electrolyte layer, i.e., the whole thin plate member is difficult to be deformed by the internal stress caused by the thermal expansion coefficient between layers.

Alternatively, the thickness of the fuel electrode layer in the thick part is greater than the thickness of the fuel electrode layer in the thin part, whereby the thin plate member can be formed in which the thickness of the thick part is greater than the thickness of the thin part. It is preferable that the difference between the thickness of the fuel electrode layer in the thick part and the thickness of the fuel electrode layer in the thin part is not less than 10 µm and not more than 300 µm.

By virtue of this configuration, the whole solid electrolyte can be made extremely thin and uniform, whereby the internal electrical resistance of the whole electrolyte layer can be reduced. Additionally, the fuel electrode layer in the thick part can be made sufficiently thick, so that the whole fuel electrode layer, i.e., the whole thin plate member is difficult to be deformed by the internal stress caused by the thermal expansion coefficient between layers.

By increasing the thickness of the air electrode layer in the thick part more than the thickness of the air electrode layer in the thin part, the thin plate member can also be formed in which the thickness of the thick part is greater than the thickness of the thin part. However, the air electrode layer composed of a porous body such as LSM (lanthanum strontium manganite) has a characteristic that the reaction speed for ionizing oxygen in the air is extremely small when the thickness thereof is great, so that the air electrode layer is preferably made thin and uniform. Specifically, it can generally be said that it is unpreferable to differ the thickness of the air electrode layer between the thick part and the thin part. The same is true for the fuel electrode layer, but in this case the thick part is formed in the air electrode layer and this may greatly affect the performance of the fuel cell because of the difference in the diffusion distance provided between the oxygen and the hydrogen.

When this thin plate member is used as a unit cell for an SOFC, the thin part comprises a solid electrolyte layer as the ceramic layer, a fuel electrode layer formed on one surface of the solid electrolyte layer, and an air electrode layer formed on the other surface of the solid electrolyte layer, these layers being laminated, and the thick part comprises a warp correction layer, which is a layer for reducing the warp of the thin plate member caused by the difference in the thermal expansion coefficient, laminated on the surface of the laminate member comprising the solid electrolyte layer, the fuel electrode layer, and the air electrode layer, which constitute the thin part. The warp correction layer is preferably a layer laminated on the surface at the side of the fuel electrode layer and made of a material having a thermal expansion coefficient smaller than that of the solid electrolyte layer (or fuel electrode layer).

In general, the thermal expansion coefficient of the fuel electrode layer composed of a porous body such as Ni-YSZ cermet is greater than the thermal expansion coefficient of the solid electrolyte layer, and the thermal expansion coefficient of the air electrode layer composed of a porous body such as LSM (lanthanum strontium manganite) is generally equal to the thermal expansion coefficient of the solid electrolyte layer. Therefore, by laminating the warp correction layer made of a material having a thermal expansion coefficient smaller than the thermal expansion coefficient of the solid electrolyte layer (or fuel electrode layer) on the surface at the side of the fuel electrode layer formed on one surface of the solid electrolyte layer, the deformation direction of the thin plate member based upon the internal stress caused by the difference in the thermal expansion coefficient between the solid electrolyte layer and the fuel electrode layer and the deformation direction of the thin plate member based upon the internal stress caused by the difference in the thermal expansion coefficient between the fuel electrode layer and the warp correction layer can be made opposite to each other.

As a result, the whole solid electrolyte layer can be made extremely thin and uniform, whereby the internal electrical resistance in the whole solid electrolyte layer can be reduced. Further, the deformation of the whole thin plate member with respect to the internal stress caused by the difference in the thermal expansion coefficient between layers can be reduced.

Further, the deformation direction of the thin plate member based upon the internal stress caused by the difference in the thermal expansion coefficient between the solid electrolyte layer and the fuel electrode layer and the deformation direction of the thin plate member based upon the internal stress caused by the difference in the thermal expansion coefficient between the air electrode layer and the warp correction layer can be made opposite to each other, even by laminating, onto the surface at the side of the air electrode layer formed on the other surface of the solid electrolyte layer, a warp correction layer made of a material having a thermal expansion coefficient greater than the thermal expansion coefficient of the solid electrolyte layer (or air electrode layer), which means that the same effect can be obtained.

As the warp correction layer, a layer made of a material having a thermal expansion coefficient smaller than the thermal expansion coefficient of the solid electrolyte layer (or fuel electrode layer) may be laminated on the surface of the fuel electrode layer, and a layer made of a material having a thermal expansion coefficient greater than the thermal expansion coefficient of the solid electrolyte layer (or air electrode layer) may be laminated on the surface of the air electrode layer.

The thick part may be a laminate member comprising a warp correction layer, which is a layer made of a material having a thermal expansion coefficient smaller than the thermal expansion coefficient of the solid electrolyte layer (or fuel electrode layer) and for reducing the warp on the thin plate member caused by the difference in the thermal expansion coefficient, embedded into the fuel electrode layer, in the laminate member comprising the solid electrolyte layer, the fuel electrode layer, and the air electrode layer, which constitute the thin part. In this case, a second warp correction layer may be laminated on the surface of the air electrode layer in the thick part, the second warp correction layer being made of a material having a thermal expansion coefficient greater than the thermal expansion coefficient of the solid electrolyte layer (air electrode layer) and being formed for reducing the warp on the thin plate member caused by the difference in the thermal expansion coefficient. By virtue of this configuration, the same effect can be obtained.

In the above description, the thickness of each of the warp correction layers is preferably not less than 10 μm and not more than 100 μm.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 30 is a table showing a result of an experiment in which warping amounts of a whole thin plate member with respect to various combinations of a thickness of a thin part and a thickness of a thick part are measured for a thin plate member shown in FIG. 31.

DETAILED DESCRIPTION OF THE INVENTION

A thin plate member according to each embodiment of the present invention will be explained with reference to drawings.

Figure 1:
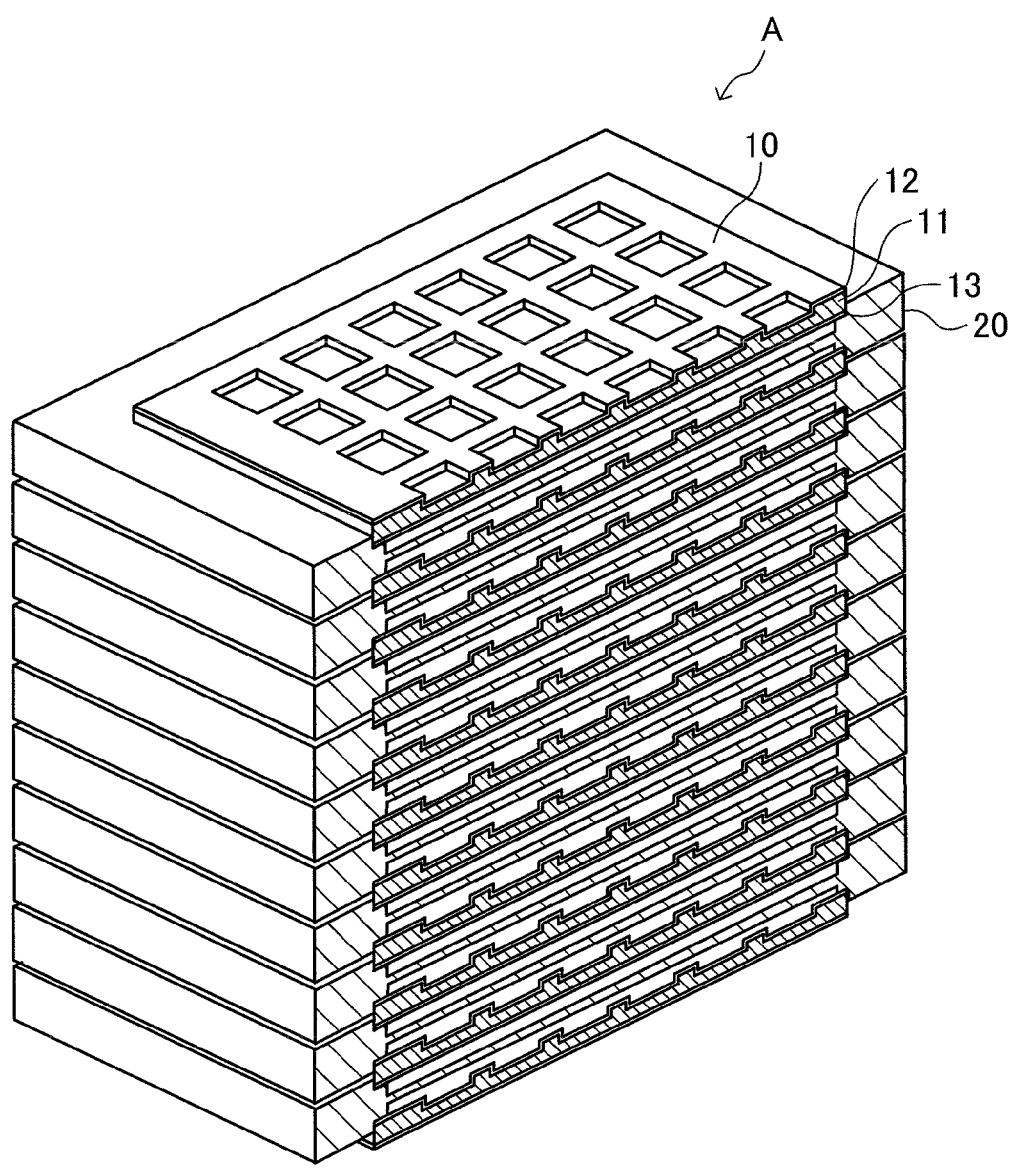
FIG. 1 is a cutaway perspective view of an SOFC using a thin plate member according to a first embodiment of the present invention.

FIG. 1 is a cutaway sectional view of a solid oxide fuel cell (SOFC, hereinafter simply referred to as "fuel cell") A that uses a thin plate member 10 according to a first embodiment of the present invention. The fuel cell A is formed by alternately laminating the thin plate member 10 and a support member 20. Specifically, the fuel cell A has a stack structure. The thin plate member 10 is also referred to as a "unit cell" of the fuel cell A. The support member 20 is also referred to as an "interconnector".

The thin plate member 10 has an electrolyte layer (solid electrolyte layer) 11, a fuel electrode layer 12 formed on (the upper surface of) the electrolyte layer 11, and an air electrode layer 13 formed on the surface (on the lower surface) of the electrolyte layer 11 opposite to the fuel electrode layer 12. The thin plate member 10 is a plate-like member having a square planar shape.

In this embodiment, the electrolyte layer 11 is a dense sintered body of YSZ (stabilized zirconia doped with yttria) serving as a ceramic layer. The fuel electrode layer 12 is a sintered body made of Ni-YSZ, which is a porous electrode layer. The air electrode layer 13 is a sintered body made of LSM (La(Sr)MnO3: lanthanum strontium manganite)—YSZ, which is a porous electrode layer. The average thermal expansion coefficient of each of the electrolyte layer 11, fuel electrode layer 12, and air electrode layer 13 at the temperature range of from room temperature to 1000° C. is approximately 10.8 ppm/K, 12.5 ppm/K, and 11 (10.8) ppm/K, wherein the thermal expansion coefficient of the fuel electrode layer 12 is greater than the thermal expansion coefficient of the electrolyte layer 11, and the thermal expansion coefficient of the air electrode layer 13 is generally equal to the thermal expansion coefficient of the electrolyte layer 11.

In the fuel cell A, fuel is supplied to a fuel flow path 32 formed between the fuel electrode layer 12 of the thin plate member 10 and the lower surface (of the planar portion) of the support member 20, and air is supplied to an air flow path 31 formed between the air electrode layer 13 of the thin plate member 10 and the upper surface (of the planar portion) of the support member 20, whereby power generation on the basis of the chemical equations (1) and (2) shown below is performed.

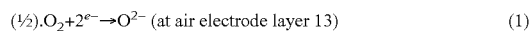

$$(\tfrac{1}{2}) \cdot O_2 + 2e^- \rightarrow O^{2-} \text{ (at air electrode layer 13)} \quad (1)$$

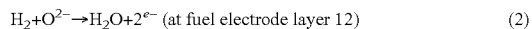

$$H_2 + O^{2-} \rightarrow H_2O + 2e^- \text{ (at fuel electrode layer 12)} \quad (2)$$

First Embodiment

Figure 3:
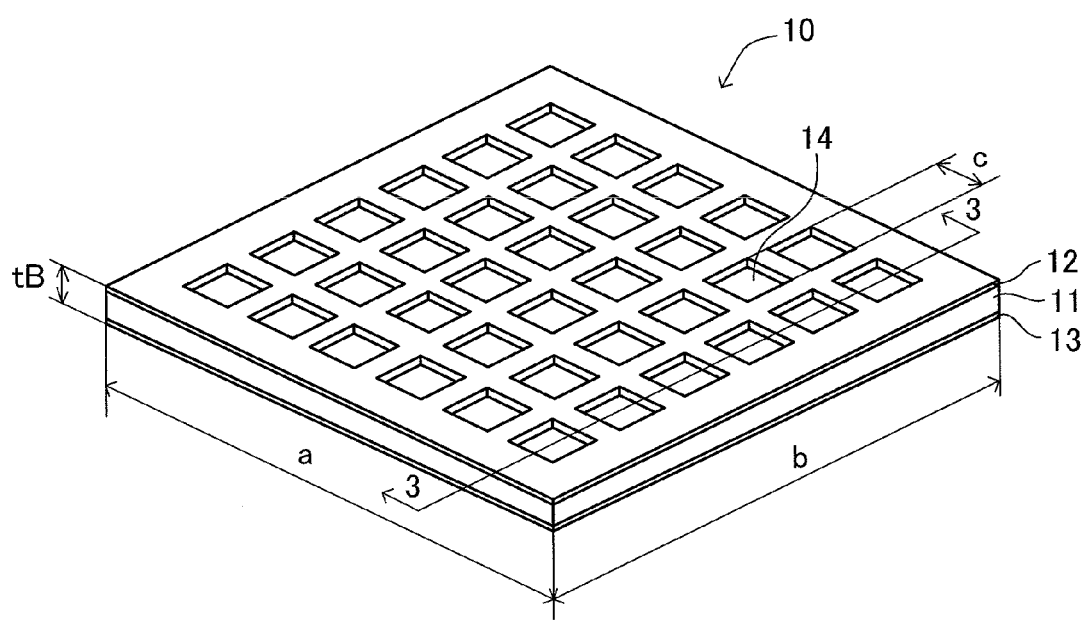
FIG. 3 is a perspective view of the thin plate member shown in FIG. 1.

Subsequently, the structure of the thin plate member 10 according to the first embodiment will be explained in detail. As described above, the thin plate member 10 is square seen in a plane. As shown in FIG. 3 that is a perspective view, the length a of one side of the thin plate member 10 and the length b of the other side orthogonal to the one side are not less than 5 mm and not more than 200 mm.

Figure 4:
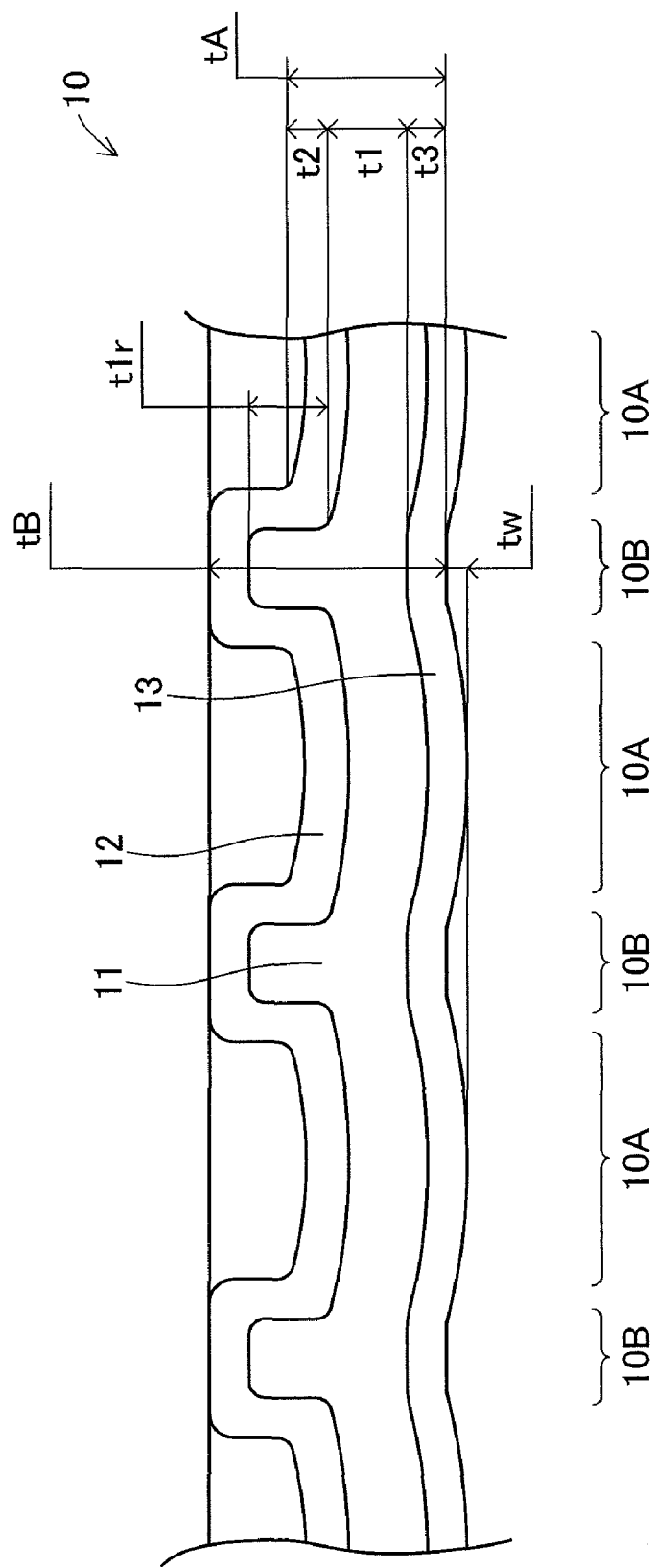
FIG. 4 is a partial sectional view of the thin plate member cut along a plane including 3-3 line shown in FIG. 3 and perpendicular to the plane of the thin plate member.

FIG. 4 is a partial sectional view of the thin plate member 10 cut along the plane that includes 3-3 line parallel to the side having the length b and is perpendicular to the plane of the thin plate member 10.

As understood from FIGS. 3 and 4, the thin plate member 10 includes a portion having a thickness tA (hereinafter referred to as "thin part 10A") and a portion having a thickness tB that is greater than the thickness tA (hereinafter referred to as "thick part 10B"). The thin part 10A corresponds to plural (specifically, 6×6=36) concave portions 14 (see FIG. 3) having a square shape seen in a plane and arranged at equally spaced intervals (in a matrix, in a lattice) in longitudinal and lateral directions. The thick part 10B corresponds to the remaining portion except for the thirty-six concave portions 14.

The length c of one side of the concave portion 14 having a square shape seen in a plane is not less than 1 mm and not more than 10 mm. Therefore, the ratio of the orthogonal projection area of the thick part 10B to the orthogonal projection area of the whole thin plate member 10 seen in a plane is 5% or more.

The thin part 10A and the thick part 10B are made by laminating only the aforesaid electrolyte layer 11, fuel electrode layer 12 formed on the upper surface of the electrolyte layer 11, and air electrode layer 13 formed on the lower surface of the electrolyte layer 11.

In the thin part 10A, the thickness t1 of the electrolyte layer 11, the thickness t2 of the fuel electrode layer 12, and the thickness t3 of the air electrode layer are respectively not less than 2 μm and not more than 50 μm, not less than 5 μm and not more than 200 μm, and not less than 5 μm and not more than 50 μm. Therefore, the thickness tA of the thin part 10A is not less than 12 μm and not more than 300 μm.

In the thick part 10B, the thickness of the fuel electrode layer 12 and the thickness of the air electrode layer 13 are (generally) equal to the thickness t2 of the fuel electrode layer 12 and the thickness t3 of the air electrode layer 13 in the thin part 10A. On the other hand, the electrolyte layer 11 in the thick part 10B has a thickness (t1+t1r) obtained by adding t1r to the thickness t1 of the electrolyte layer 11 in the thin part 10A. The thickness t1r is not less than 10 μm and not more than 100 μm.

In other words, in the whole thin plate member 10, the thickness of the fuel electrode layer 12 and the thickness of the air electrode layer 13 are uniform, while the thickness of the electrolyte layer 11 in the thick part 10B is greater than the thickness of the electrolyte layer 11 in the thin part 10A by the thickness t1r. As a result, the thickness tB of the thick part 10B is greater than the thickness tA of the thin part 10A by the thickness t1r.

Further, each of the thin parts 10A warps (projects) in the direction perpendicular to the plane of the thin plate member 10 (specifically, in the direction of the lower surface (at the side of the air electrode layer 13) of the thin plate member 10) (see FIG. 4). The position of each apex of the warp seen in a plane corresponds to the center of each concave portion 14 having a square shape seen in a plane. The height tw of the warp in the direction perpendicular to the plane of the thin plate member 10 is not less than 1 μm and not more than 100 μm.

In the thin plate member 10 having the aforesaid configuration and dimension and used as a unit cell of the fuel cell A, the electrolyte layer 11 in the thin part 10A is extremely thin. Accordingly, the internal electrical resistance of the whole electrolyte layer 11 can be reduced. The movement of oxygen ions $O^{2-}$ involved with the reaction of the aforesaid chemical equations (1) and (2) in the electrolyte layer 11 is performed mainly in the thin part 10A having a small internal electrical resistance. Specifically, the reactions of the aforesaid chemical equations (1) and (2) are mainly produced in the thin part 10A.

Further, in the thick part 10B, the electrolyte layer 11 is sufficiently thick, and has sufficiently great bending resistance. Therefore, the whole electrolyte layer 11, i.e., the whole thin plate member 10 is difficult to be deformed with respect to the internal stress caused by the difference in the thermal expansion coefficient between the electrolyte layer 11 and the fuel electrode layer 12.

Each of the thin parts 10A has a shape (convex shape) warped (projected) toward the air electrode layer 13. By virtue of this configuration, the whole thin plate member 10 is more difficult to be deformed with respect to the internal stress caused by the difference in the thermal expansion coefficient.

Figure 2:
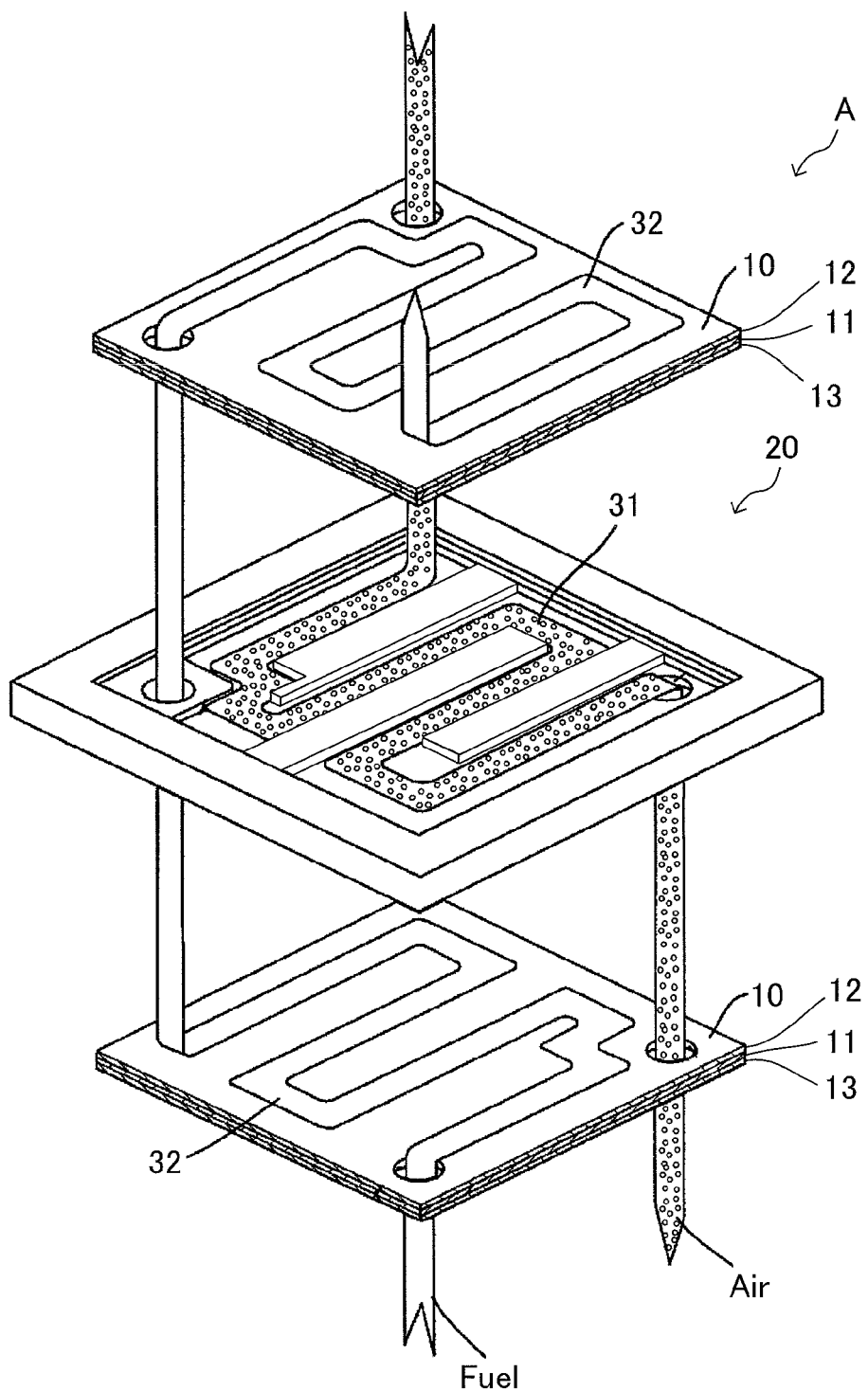
FIG. 2 is a view for explaining a flow route of fuel and air in the SOFC shown in FIG. 1.

From the above, the problem hardly arises that the deformed thin plate member 10 closes the air flow path 31 or fuel flow path 32 shown in FIG. 2, or the pressure loss produced when air flows through the air flow path 31 or the pressure loss produced when fuel flows through the fuel flow path 32 increases due to the deformation of the thin plate member 10.

Since each thin part 10A warps (projects) toward the air electrode layer 13, the air flowing through the air flow path 31 shown in FIG. 2 is easy to go into the porous body of the air electrode layer 13. This is based upon the fact that, when high-speed gas flows in the vicinity of the surface of the air electrode layer, an eddy of flow is produced due to the warp of the thin part in a convex shape, and therefore, the diffusion of gas is promoted. As a result, the effect of promoting the reaction of the aforesaid chemical equation (1) can also be provided.

Figure 5:
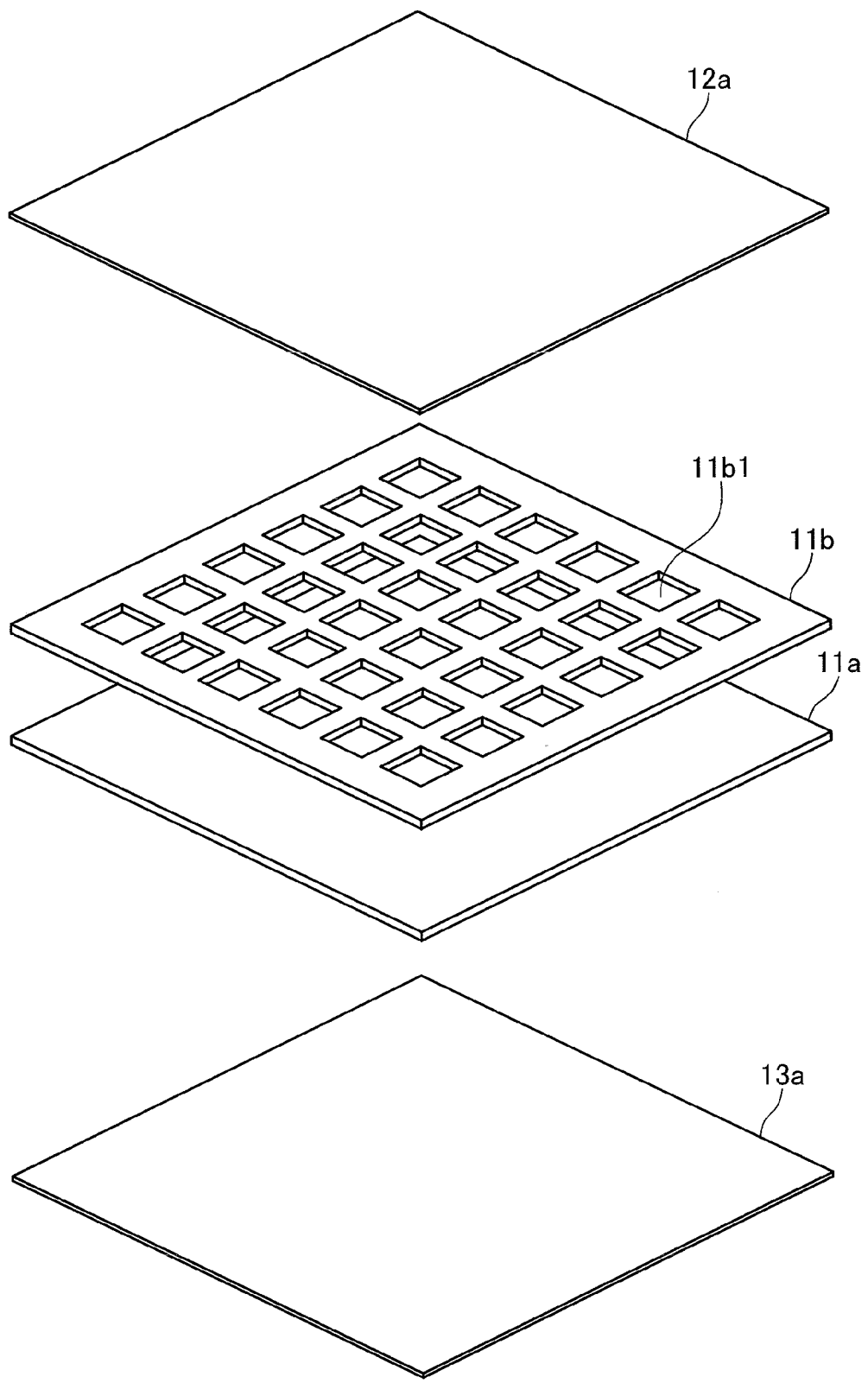
FIG. 5 is a view for explaining a manufacturing method of the thin plate member shown in FIG. 3.

Next, a manufacturing method of the thin plate member 10 shown in FIG. 3 will be explained with reference to FIG. 5. Firstly, a ceramic sheet (serving as the electrolyte layer 11) 11b having a square pattern on which thirty-six square penetrating windows 11b1 corresponding to the aforesaid thirty-six concave portions 14 (see FIG. 3) is formed, by a printing method, on the upper surface of a square ceramic sheet (serving as the electrolyte layer 11) 11a formed by a green sheet method, and the resultant is sintered for one hour at 1400° C.

Then, a square sheet (serving as the fuel electrode layer 12) 12a is formed on the upper surface of the sintered body by a printing method, and the resultant is sintered for one hour at 1400° C. In this case, the sheet (serving as the fuel electrode layer 12) is formed along the concave/convex on the surface of the sintered body (the layer serving as the electrolyte layer 11).

A square sheet (a layer serving as the air electrode layer 13) 13a is formed on the lower surface of the sintered body by a printing method, and the resultant is sintered for one hour at 1200° C. Thus, the thin plate member 10 shown in FIG. 3 is formed. It is to be noted that the warp on the thin part 10A is naturally formed during the process of forming the thin plate member 10 by sintering.

The sheet 12a may be formed on the upper surface of the laminate member of the ceramic sheets 11a and 11b by a printing method, both may be sintered for one hour at 1400° C., and then, the sheet 13a may be formed by the aforesaid method. Alternatively, the laminate member of the ceramic sheets 11a and 11b and the sheet 12a may integrally be laminated, and sintered for one hour at 1400° C., and then, the sheet 13a may be formed by the aforesaid method.

Although the shape of each thin part 10A seen in a plane is a square in which the length of one side is not less than 1 mm and not more than 10 mm, the shape of each thin part 10A may be rectangle in which the length of the long side is not less than 1 mm and not more than 10 mm.

Modified Example of the First Embodiment

Figure 6:
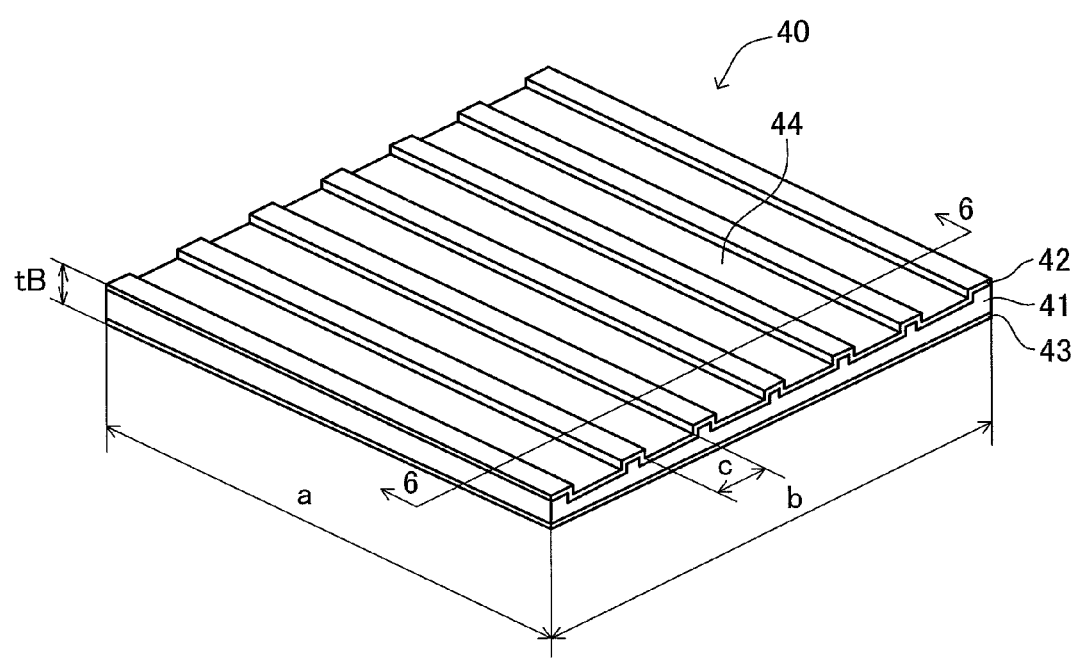
FIG. 6 is a perspective view of a thin plate member according to a modified example of the first embodiment of the present invention.

Subsequently, a thin plate member 40 according to the modified example of the first embodiment will be explained. The thin plate member 40 is also square seen in a plane. As shown in FIG. 6 that is a perspective view, the length a of one side of the thin plate member 40 and the length b of the other side orthogonal to the one side are not less than 5 mm and not more than 200 mm.

Figure 7:
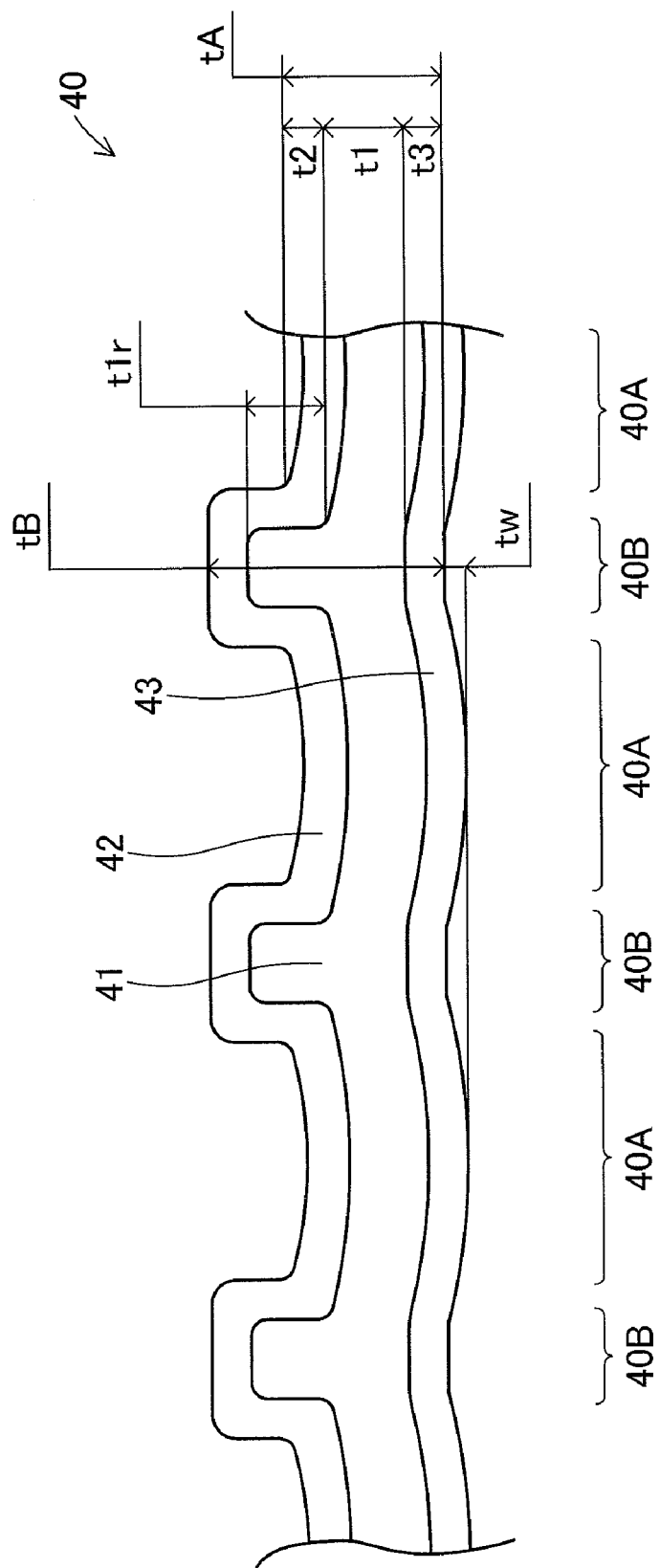
FIG. 7 is a partial sectional view of the thin plate member cut along a plane including 6-6 line shown in FIG. 6 and perpendicular to the plane of the thin plate member.

FIG. 7 is a partial sectional view of the thin plate member 40 cut along a plane that includes 6-6 line parallel to the side with the length b and is perpendicular to the plane of the thin plate member 40 in FIG. 6.

As understood from FIGS. 6 and 7, the thin plate member 40 includes a thin part 40A having a thickness of tA and a thick part 40B having a thickness tB that is greater than the thickness tA, like the thin plate member 10. The thin part 40A corresponds to plural (specifically, six) groove portions 44 (see FIG. 6) having a rectangular shape seen in a plane and arranged in equally spaced intervals so as to be parallel to the side with the length a. The thick part 40B corresponds to the remaining portion except for six groove portions 44.

The width of the groove portion 44 seen in a plane (the length in the direction along the side with the length b) is not less than 1 mm and not more than 10 mm. Therefore, the ratio of the orthogonal projection area of the thick part 40B to the orthogonal projection area of the whole thin plate member 40 is 5% or more.

The thin part 40A and the thick part 40B are made by laminating only an electrolyte layer 41 made of a material same as that of the electrolyte layer 11, fuel electrode layer 42 formed on the upper surface of the electrolyte layer 41 and made of a material same as that of the fuel electrode layer 12, and air electrode layer 43 formed on the lower surface of the electrolyte layer 41 and made of a material same as that of the air electrode layer 13.

The thin plate member 40 is different from the thin plate member 10 in the shape of the thin part 40A seen in a plane, and is the same as the thin plate member 10 in the other points (thicknesses t1, t2, t3, t1r, tw, etc.).

The thin plate member 40 that has the above-mentioned configuration and size and that can be used as a unit cell of the fuel cell A also provides the operation and effect same as those of the thin plate member 10.

Figure 8:
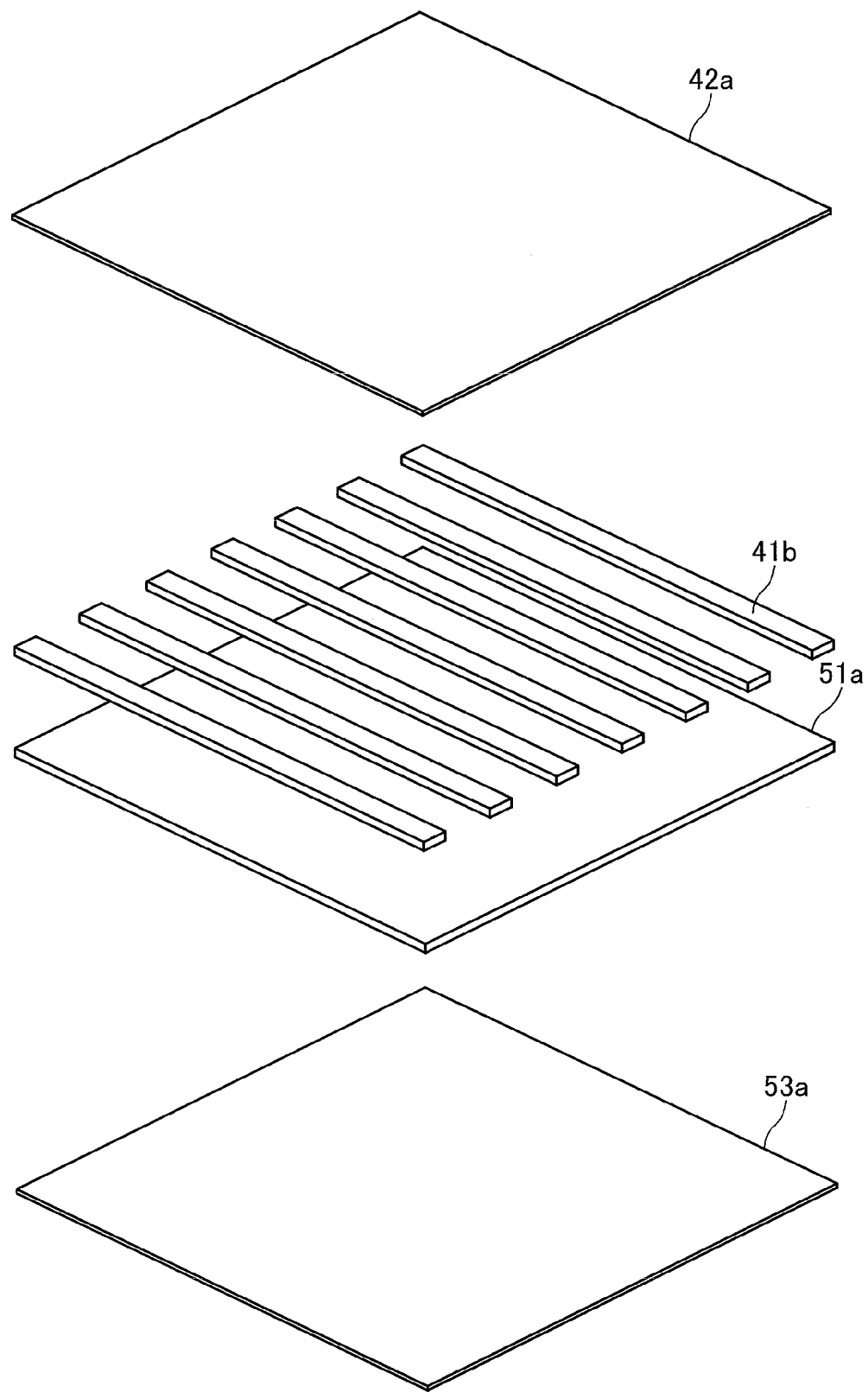
FIG. 8 is a view for explaining a manufacturing method of the thin plate member shown in FIG. 6.

Next, the manufacturing method of the thin plate member 40 shown in FIG. 6 will be explained with reference to FIG. 8. Firstly, seven rectangular ceramic sheets (serving as the electrolyte layer 41) 41b that are formed by a green sheet method and correspond to the remaining portion except for the aforesaid six groove portions 44 (see FIG. 6), seen in a plane, are formed, by a printing method, on the upper surface of a ceramic sheet (serving as the electrolyte layer 41) 41a, and the resultant is sintered for one hour at 1400° C.

Then, a square sheet (serving as the fuel electrode layer 42) 42a is formed on the upper surface of the sintered body by a printing method, and the resultant is sintered for one hour at 1400° C.

A square sheet (a layer serving as the air electrode layer 43) 43a is similarly formed on the lower surface of the sintered body by a printing method, and the resultant is sintered for one hour at 1200° C. Thus, the thin plate member 40 shown in FIG. 6 is formed. It is to be noted that the warp on the thin part 40A is naturally formed during the process of forming the thin plate member 40 by sintering.

The sheet 42a may be formed on the upper surface of the laminate member of the ceramic sheets 41a and 41b by a printing method, both may be sintered for one hour at 1400° C., and then, the sheet 43a be formed by the aforesaid method. Alternatively, the laminate member of the ceramic sheets 41a and 41b and the sheet 42a may integrally be laminated, and sintered for one hour at 1400° C., and then, the sheet 43a may be formed by the aforesaid method.

Second Embodiment

Figure 9:
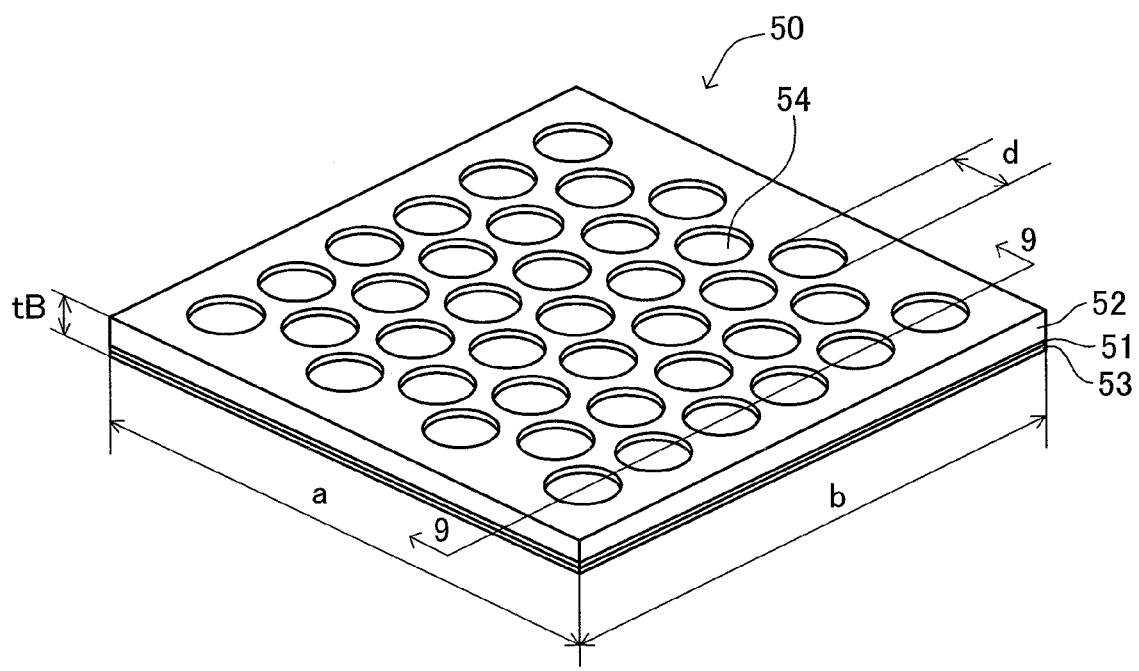
FIG. 9 is a perspective view of a thin plate member according to a second embodiment of the present invention.

Subsequently, a thin plate member 50 according to the second embodiment will be explained in detail. The thin plate member 50 is a square seen in a plane. As shown in FIG. 9 that is a perspective view, the length a of one side of the thin plate member 50 and the length b of the other side orthogonal to the one side are not less than 5 mm and not more than 200 mm.

Figure 10:
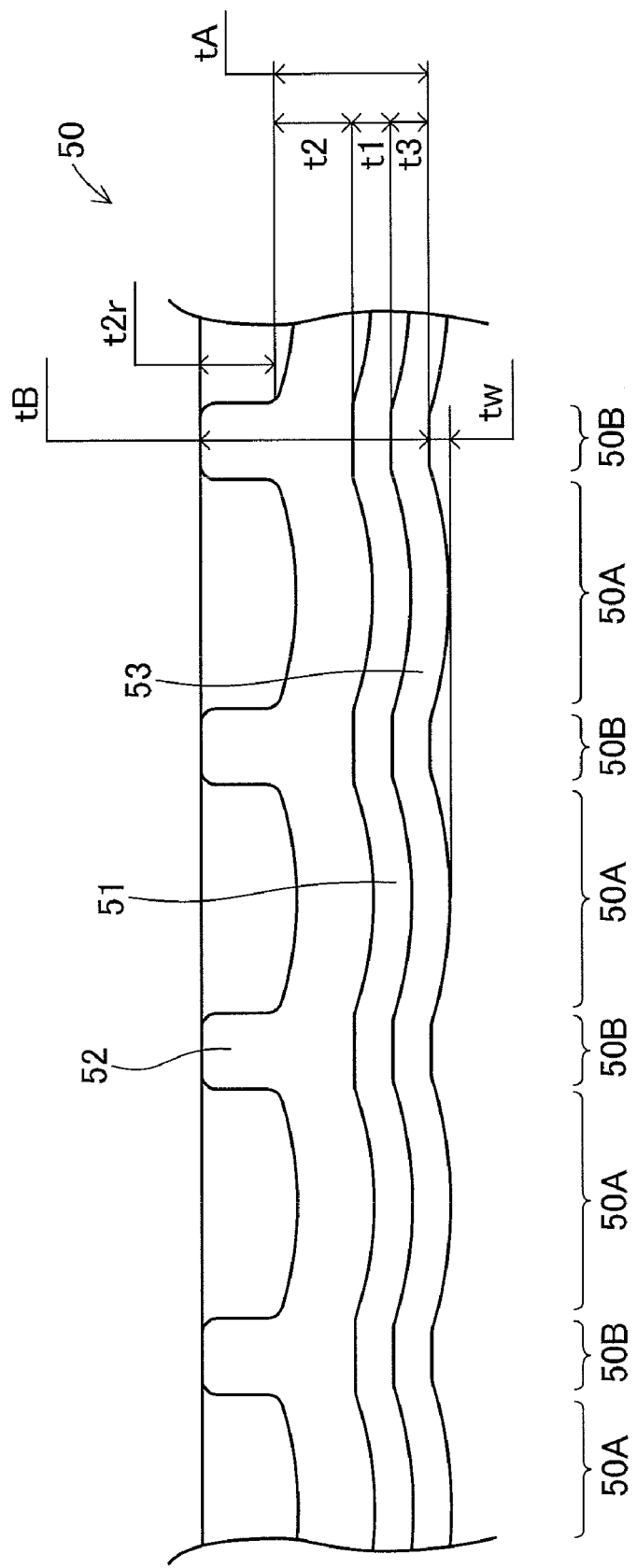
FIG. 10 is a partial sectional view of the thin plate member cut along a plane including 9-9 line shown in FIG. 9 and perpendicular to the plane of the thin plate member.

FIG. 10 is a partial sectional view of the thin plate member 50 cut along a plane that includes 9-9 line parallel to the side with the length b and is perpendicular to the plane of the thin plate member 50 in FIG. 9.

As understood from FIGS. 9 and 10, the thin plate member 50 includes a thin part 50A having a thickness of tA and a thick part 50B having a thickness of tB that is greater than the thickness tA. The thin part 50A corresponds to plural (specifically, 6×4+5×3=39) concave portions 54 (see FIG. 9) having a circular shape seen in a plane and arranged in the longitudinal direction and lateral direction with a predetermined rule (in a matrix, in a lattice). The thick part 50B corresponds to the remaining portion except for thirty-nine concave portions 54.

The diameter d of the concave portion 54 having a circular shape is not less than 1 mm and not more than 10 mm. Therefore, the ratio of the orthogonal projection area of the thick part 50B to the orthogonal projection area of the whole thin plate member 50 is 5% or more.

The thin part 50A and the thick part 50B are made by laminating only an electrolyte layer 51 made of a material same as that of the electrolyte layer 11, fuel electrode layer 52 formed on the upper surface of the electrolyte layer 51 and made of a material same as that of the fuel electrode layer 12, and air electrode layer 53 formed on the lower surface of the electrolyte layer 51 and made of a material same as that of the air electrode layer 13.

At the thin part 50A, the thickness t1 of the electrolyte layer 51, the thickness t2 of the fuel electrode layer 52, and the thickness t3 of the air electrode layer 53 are respectively not less than 2 μm and not more than 10 μm, not less than 5 μm and not more than 50 μm, and not less than 5 μm and not more than 50 μm. Therefore, the thickness tA of the thin part 50A is not less than 12 μm and not more than 110 μm.

In the thick part 50B, the thickness of the electrolyte layer 51 and the thickness of the air electrode layer 53 are (generally) equal to the thickness t1 of the electrolyte layer 51 and the thickness t3 of the air electrode layer 53 in the thin part 50A. On the other hand, the fuel electrode layer 52 in the thick part 50B has a thickness (t2+t2r) obtained by adding t2r to the thickness t2 of the fuel electrode layer 52 in the thin part 50A. The thickness t2r is not less than 50 μm and not more than 300 μm.

In other words, in the whole thin plate member 50, the thickness of the electrolyte layer 51 and the thickness of the air electrode layer 53 are uniform, while the thickness of the fuel electrode layer 52 in the thick part 50B is greater than the thickness of the fuel electrode layer 52 in the thin part 50A by the thickness t2r. As a result, the thickness tB of the thick part 50B is greater than the thickness tA of the thin part 50A by the thickness t2r.

Further, each of the thin parts 50A warps (projects) in the direction perpendicular to the plane of the thin plate member 50 (specifically, in the direction of the lower surface (at the side of the air electrode layer 53) of the thin plate member 50) (see FIG. 10). The position of each apex of the warp seen in a plane corresponds to the center of each concave portion 54 having a circular shape seen in a plane. The height tw of the warp in the direction perpendicular to the plane of the thin plate member 50 is not less than 1 μm and not more than 100 μm.

In the thin plate member 50 having the aforesaid configuration and dimension and used as a unit cell of the fuel cell A, the electrolyte layer 51 in the thin part 50A is extremely thin. Accordingly, the internal electrical resistance of the whole electrolyte layer 51 can be reduced. The reaction of the aforesaid chemical equation (2) in the fuel electrode layer 52 is performed mainly in the thin part 50A having a small internal electrical resistance. Specifically, the reactions of the aforesaid chemical equations (1) and (2) are mainly produced in the thin part 50A.

Further, in the thick part 50B, the fuel electrode layer 52 is sufficiently thick, and has sufficiently great bending resistance. Therefore, the whole fuel electrode layer 52, i.e., the whole thin plate member 50 is difficult to be deformed with respect to the internal stress caused by the difference in the thermal expansion coefficient between the electrolyte layer 51 and the fuel electrode layer 52.

Each of the thin parts 50A has a shape (convex shape) warped (projected) toward the air electrode layer 53. By virtue of this configuration, the whole thin plate member 50 is more difficult to be deformed with respect to the internal stress caused by the difference in the thermal expansion coefficient.

From the above, the problem hardly arises that the deformed thin plate member 50 closes the air flow path 31 or fuel flow path 32 shown in FIG. 2, or the pressure loss produced when air flows through the air flow path 31 or the pressure loss produced when fuel flows through the fuel flow path 32 increases due to the deformation of the thin plate member 50.

Since each thin part 50A warps (projects) toward the air electrode layer 53, the air flowing through the air flow path 31 shown in FIG. 2 is easy to go into the porous body of the air electrode layer 53. As a result, the effect of promoting the reaction of the aforesaid chemical equation (1) can also be provided.

Figure 11:
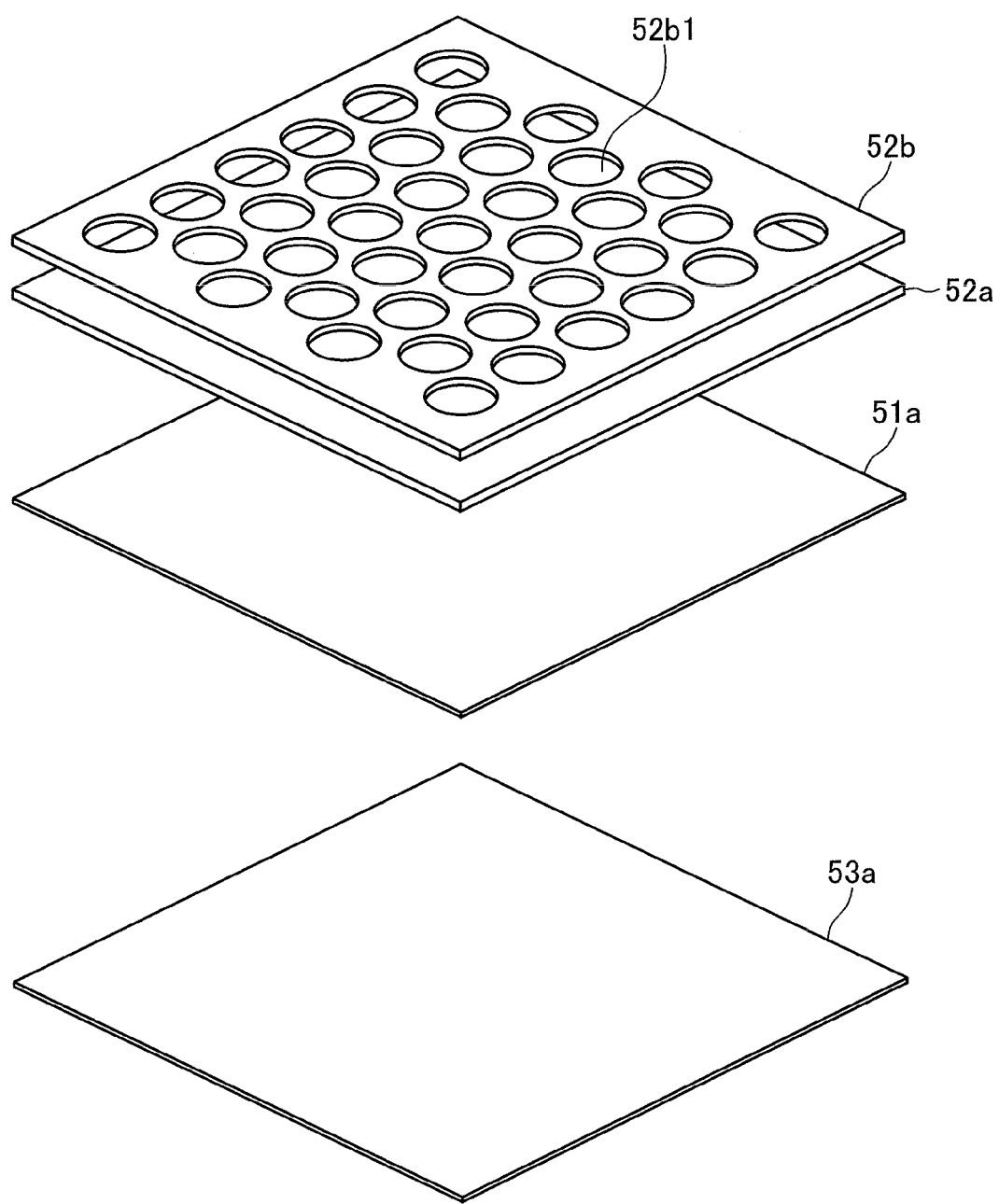
FIG. 11 is a view for explaining a manufacturing method of the thin plate member shown in FIG. 9.

Next, a manufacturing method of the thin plate member 50 shown in FIG. 9 will be explained with reference to FIG. 11. Firstly, a square ceramic sheet (serving as the electrolyte layer 51) 51a formed by a green sheet method is sintered for one hour at 1400° C.

Next, a square ceramic sheet (serving as the fuel electrode layer 52) 52a is formed on the upper surface of the sintered body by a printing method, then, a square sheet (serving as the fuel electrode layer 52) 52b having formed thereon thirty-nine circular penetrating windows 52b1 corresponding to the aforesaid thirty-nine concave portions 54 (see FIG. 9) is integrally laminated on its upper surface, and then the resultant is sintered for one hour at 1400° C.

Then, a square sheet (a layer serving as the air electrode layer 53) 53a is similarly formed on the lower surface of the sintered body by a printing method, and the resultant is sintered for one hour at 1200° C. Thus, the thin plate member 50 shown in FIG. 9 is formed. It is to be noted that the warp on the thin part 50A is naturally formed during the process of forming the thin plate member 50 by sintering.

The sheets 52a and 52b may be formed on the upper surface of the ceramic sheet 51a by a printing method or sheet laminating method, both may be sintered for one hour at 1400° C., and then, the sheet 53a may be formed by the aforesaid method. Alternatively, the laminate member of the ceramic sheet 51a and the sheets 52a and 52b may integrally be laminated, and sintered for one hour at 1400° C., and then, the sheet 53a may be formed by the aforesaid method.

Although the shape of the thin part 50A seen in a plane is a circle having a diameter not less than 1 mm and not more than 10 mm in the second embodiment, the shape of the thin part 50A seen in a plane may be an ellipse having a major axis not less than 1 mm and not more than 10 mm.

Third Embodiment

Figure 12:
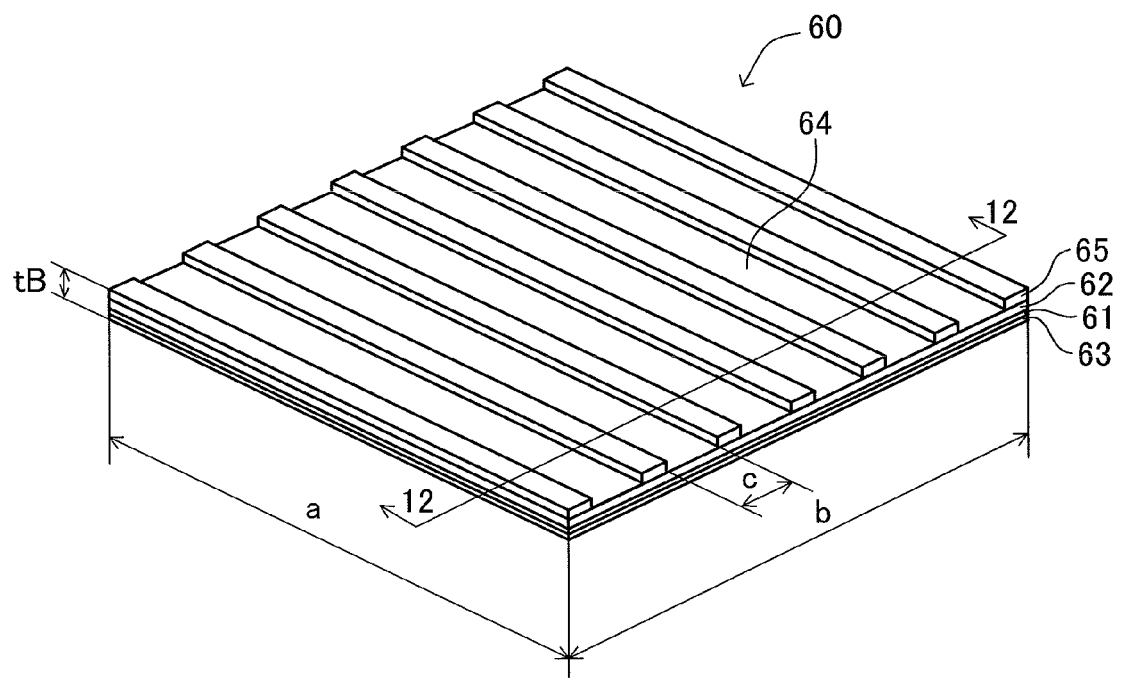
FIG. 12 is a perspective view of a thin plate member according to a third embodiment of the present invention.

Subsequently, the configuration of a thin plate member 60 according to the third embodiment will be explained. The thin plate member 60 is square seen in a plane. As shown in FIG. 12 that is a perspective view, the length a of one side of the thin plate member 60 and the length b of the other side orthogonal to the one side are not more than 5 mm and not less than 200 mm.

Figure 13:
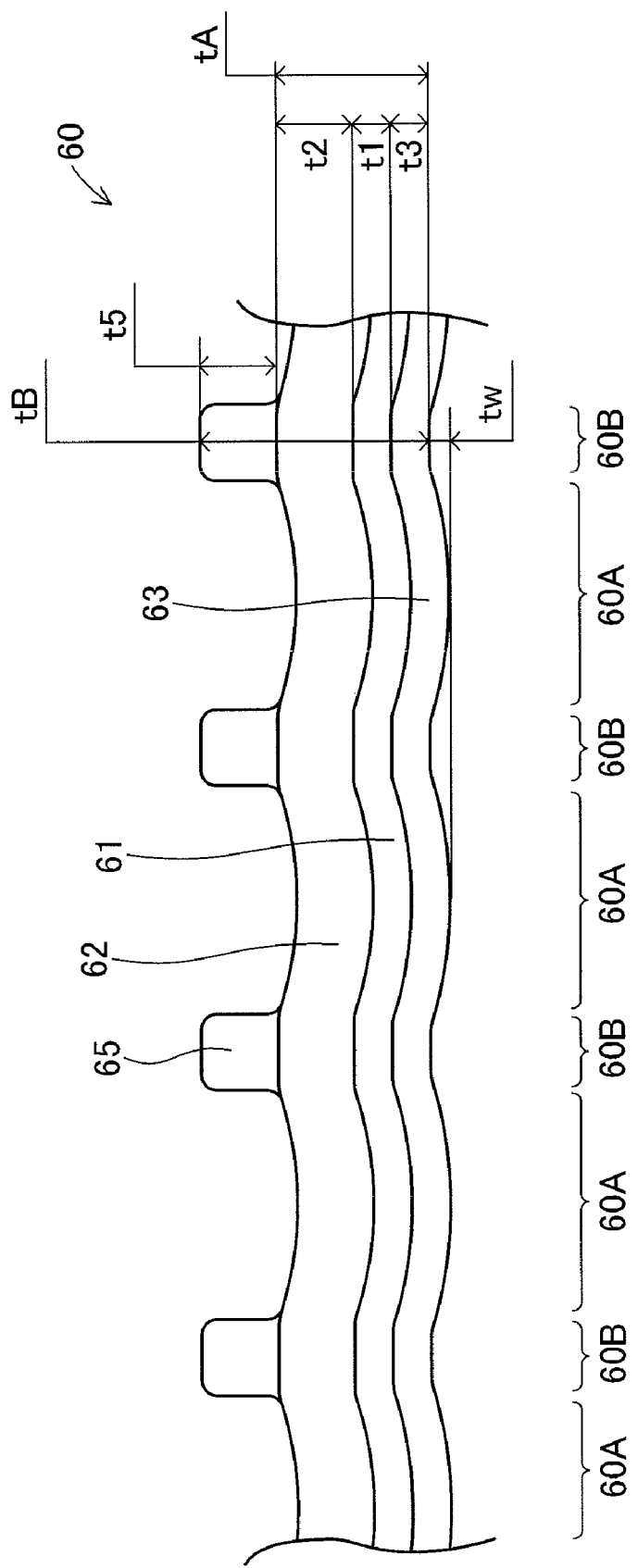
FIG. 13 is a partial sectional view of the thin plate member cut along a plane including 12-12 line shown in FIG. 12 and perpendicular to the plane of the thin plate member.

FIG. 13 is a partial sectional view of the thin plate member 60 cut along a plane that includes 12-12 line parallel to the side with the length b and is perpendicular to the plane of the thin plate member 60 in FIG. 12.

As understood from FIGS. 12 and 13, the thin plate member 60 includes a thin part 60A having a thickness of tA and a thick part 60B having a thickness of tB that is greater than the thickness tA. The thin part 60A corresponds to plural (specifically, six) groove portions 64 (see FIG. 12) having a rectangular shape seen in a plane and arranged in equally spaced intervals so as to be parallel to the side with the length a. The thick part 60B corresponds to the remaining portion except for six groove portions 64.

The width c of the groove portion 64 seen in a plane (the length in the direction along the side with the length b) is not less than 1 mm and not more than 10 mm. Therefore, the ratio of the orthogonal projection area of the thick part 60B to the orthogonal projection area of the whole thin plate member 60 is 5% or more.

The thin part 60A is made by laminating only an electrolyte layer 61 made of a material same as that of the electrolyte layer 11, fuel electrode layer 62 formed on the upper surface of the electrolyte layer 61 and made of a material same as that of the fuel electrode layer 12, and air electrode layer 63 formed on the lower surface of the electrolyte layer 61 and made of a material same as that of the air electrode layer 13. The thick part 60B further has a warp correction layer 65 on the surface of the laminate member, composed of the electrolyte layer 61, fuel electrode layer 62, and air electrode layer 63 constituting the thin part 60A, at the side of the fuel electrode layer 62.

The warp correction layer 65 is a sintered body made of alumina or zircon. It may be dense or porous. It is desirably porous considering gas permeability. In the case of the warp correction layer 65 made of alumina, the thermal expansion coefficient is approximately 8.5 ppm/K, and in the case of the warp correction layer 65 made of zircon, the thermal expansion coefficient is approximately 4.5 ppm/K. Specifically, the thermal expansion coefficient of the warp correction layer 65 is smaller than the thermal expansion coefficient of the electrolyte layer 61 (and fuel electrode layer 62). Further, in the case of the warp correction layer 65 made of alumina, Young's modulus is 300 GPa, and in the case of the warp correction layer 65 made of zircon, Young's modulus is 200 GPa.

At the thin part 60A, the thickness t1 of the electrolyte layer 61, the thickness t2 of the fuel electrode layer 62, and the thickness t3 of the air electrode layer 63 are respectively not less than 2 μm and not more than 50 μm, not less than 5 μm and not more than 200 μm, and not less than 5 μm and not more than 50 μm. Therefore, the thickness tA of the thin part 60A is not less than 12 μm and not more than 300 μm.

In the thick part 60B, the thickness of the electrolyte layer 61, the thickness of the fuel electrode layer 62 and the thickness of the air electrode layer 63 are (generally) equal to the thickness t1 of the electrolyte layer 61, the thickness t2 of the fuel electrode layer 62 and the thickness t3 of the air electrode layer 63 in the thin part 60A. Additionally, the thickness t5 of the warp correction layer 65 is not less than 10 μm and not more than 100 μm.

In other words, in the whole thin plate member 60, the thickness of the electrolyte layer 61, the thickness of the fuel electrode layer 62 and the thickness of the air electrode layer 63 are uniform. As a result, the thickness tB of the thick part 60B is greater than the thickness tA of the thin part 60A by the thickness t5 of the warp correction layer 65.

Further, each of the thin parts 60A warps (projects) in the direction perpendicular to the plane of the thin plate member 60 (specifically, in the direction of the lower surface (at the side of the air electrode layer 63) of the thin plate member 60) (see FIG. 13). The position of each apex of the warp seen in a plane corresponds to the center of the width of each groove portion 64 having a rectangular shape seen in a plane. The height tw of the warp in the direction perpendicular to the plane of the thin plate member 60 is not less than 1 μm and not more than 100 μm.

In the thin plate member 60 having the aforesaid configuration and dimension and used as a unit cell of the fuel cell A, the whole electrolyte layer 61 is extremely thin. Accordingly, the internal electrical resistance of the whole electrolyte layer 61 can be reduced. The reaction of the aforesaid chemical equation (2) in the fuel electrode layer 62 is mainly produced in the thin part 60A where the warp correction layer 65 is absent (where the internal electrical resistance is small). Specifically, the reactions of the aforesaid chemical equations (1) and (2) are mainly produced in the thin part 60A.

Further, the thermal expansion coefficient of the fuel electrode layer 62 is greater that the thermal expansion coefficient of the electrolyte layer 61, and the thermal expansion coefficient of the warp correction layer 65 is smaller than the thermal expansion coefficient of the electrolyte layer 61 (and fuel electrode layer 62). Accordingly, the deformation direction of the thin plate member 60 based upon the internal stress caused by the difference in the thermal expansion coefficient between the electrolyte layer 61 and the fuel electrode layer 62 and the deformation direction of the thin plate member 60 based upon the internal stress caused by the difference in the thermal expansion coefficient between the fuel electrode layer 62 and the warp correction layer 65 can be made reverse to each other. As a result, the deformation of the whole thin plate member 60 with respect to the internal stress caused by the difference in the thermal expansion coefficient between layers can be reduced.

Further, the warp correction layer 65 is made of a material (alumina or zircon) having a great Young's modulus. Therefore, the bending resistance is sufficiently great at the thick part 60B. Therefore, the whole thin plate member 60 is difficult to be deformed with respect to the internal stress caused by the difference in the thermal expansion coefficient between layers.

Each of the thin parts 60A has a shape (convex shape) warped (projected) toward the air electrode layer 63. By virtue of this configuration, the whole thin plate member 60 is more difficult to be deformed with respect to the internal stress caused by the difference in the thermal expansion coefficient.

From the above, the problem hardly arises that the deformed thin plate member 60 closes the air flow path 31 or fuel flow path 32 shown in FIG. 2, or the pressure loss produced when air flows through the air flow path 31 or the pressure loss produced when fuel flows through the fuel flow path 32 increases due to the deformation of the thin plate member 60.

Since each thin part 60A warps (projects) toward the air electrode layer 63, the air flowing through the air flow path 31 shown in FIG. 2 is easy to go into the porous body of the air electrode layer 63. As a result, the effect of promoting the reaction of the aforesaid chemical equation (1) can also be provided.

Figure 14:
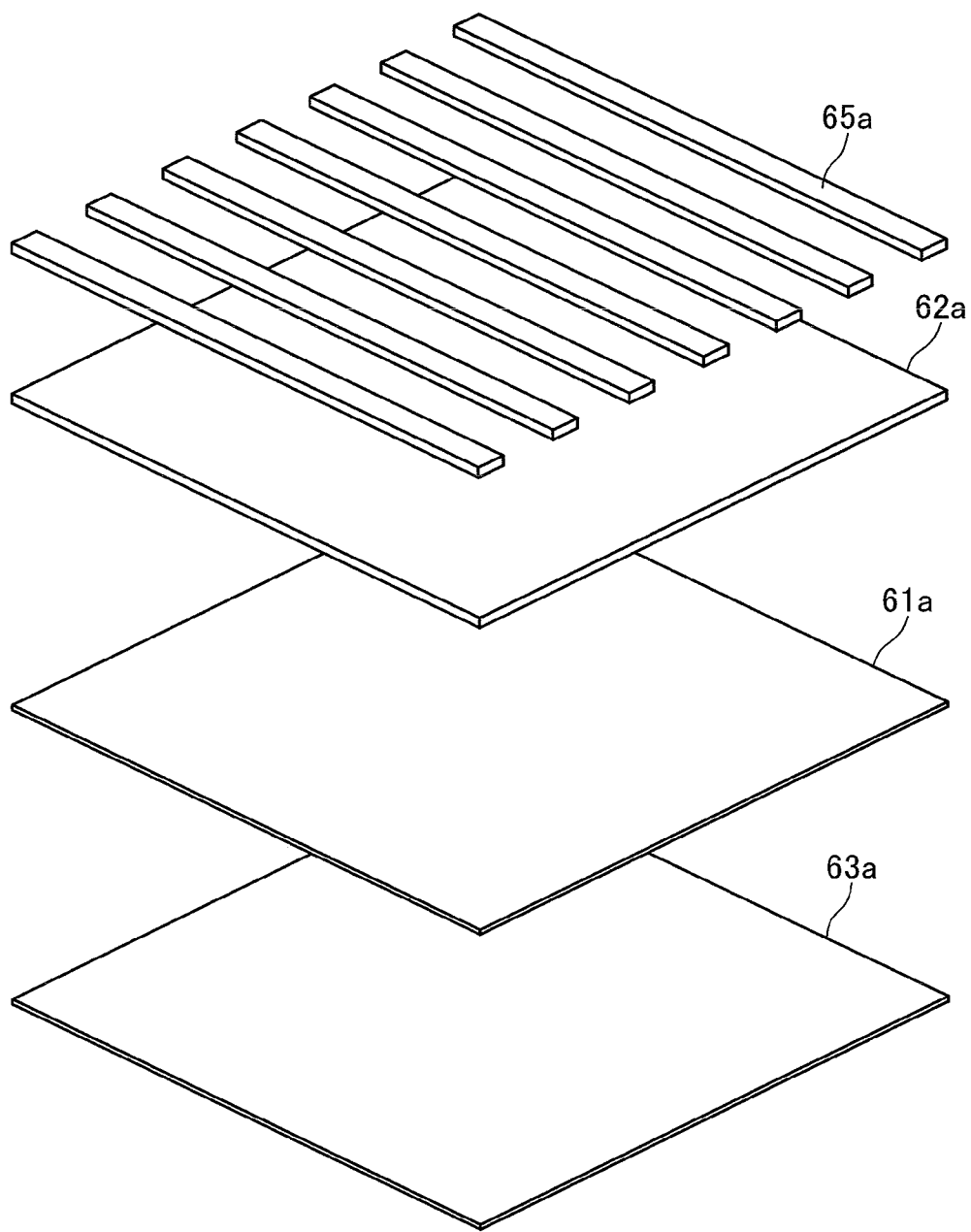
FIG. 14 is a view for explaining a manufacturing method of the thin plate member shown in FIG. 12.

Next, a manufacturing method of the thin plate member 60 shown in FIG. 12 will be explained with reference to FIG. 14. Firstly, a square ceramic sheet (serving as the electrolyte layer 61) 61a formed by a green sheet method is sintered for one hour at 1400° C.

Then, a square pattern (serving as the fuel electrode layer 62) 62a is formed on the upper surface of the sintered body by a printing method, and the resultant is sintered for one hour at 1400° C.

Next, seven rectangular ceramic sheets (serving as the warp correction layer 65) 65a that are formed by a green sheet method and correspond to the remaining portion except for the aforesaid six groove portions 64 (see FIG. 12), seen in a plane, are formed, by a printing method, on the upper surface of the sintered body, and the resultant is sintered for one hour at 1400° C.

A square sheet (a layer serving as the air electrode layer 63) 63a is similarly formed on the lower surface of the sintered body by a printing method, and the resultant is sintered for one hour at 1200° C. Thus, the thin plate member 60 shown in FIG. 12 is formed. It is to be noted that the warp on the thin part 60A is naturally formed during the process of forming the thin plate member 60 by sintering.

The sheets 62a and 65a may be formed on the upper surface of the ceramic sheet 61a by a printing method, both may be sintered for one hour at 1400° C., and then, the sheet 63a may be formed by the aforesaid method. Alternatively, the ceramic sheet 61a, sheet 62a and sheets 65a may integrally be laminated, and sintered for one hour at 1400° C., and then, the sheet 63a may be formed by the aforesaid method. Although the thick pat 60B is formed into a stripe shape seen in a plane in the first modified example of the third embodiment, it may be formed into a lattice (matrix).

Modified Example of Third Embodiment

Figure 15:
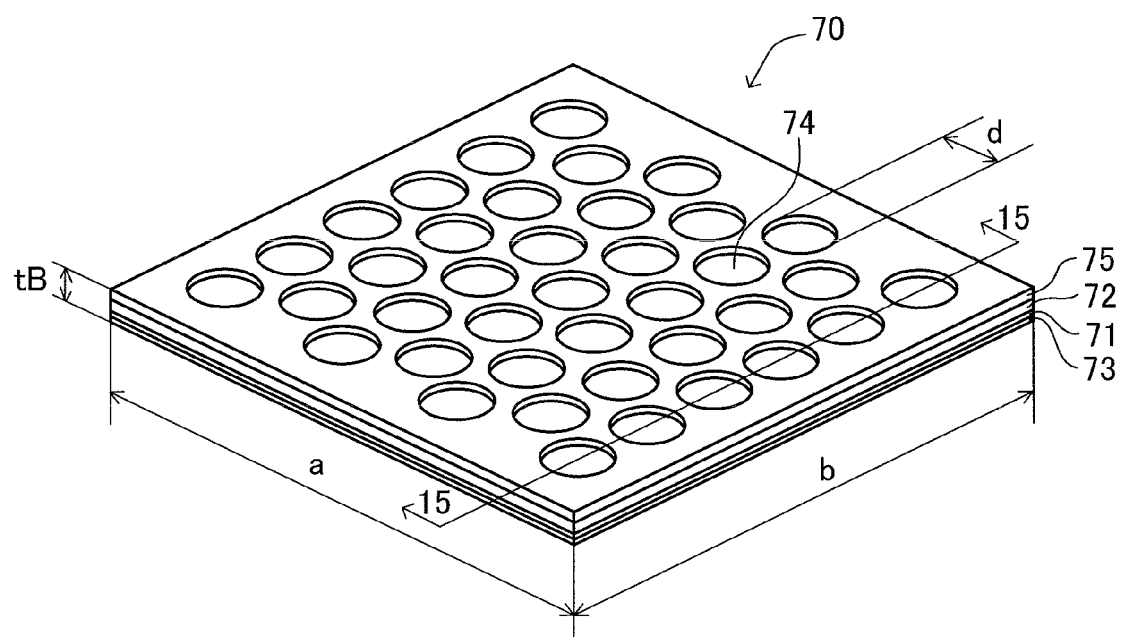
FIG. 15 is a perspective view of a thin plate member according to a first modified example of the third embodiment of the present invention.

Subsequently, a thin plate member 70 according to the first modified example of the third embodiment will be explained. The thin plate member 70 is also a square seen in a plane. As shown in FIG. 15 that is a perspective view, the length a of one side of the thin plate member 70 and the length b of the other side orthogonal to the one side are not less than 5 mm and not more than 200 mm.

Figure 16:
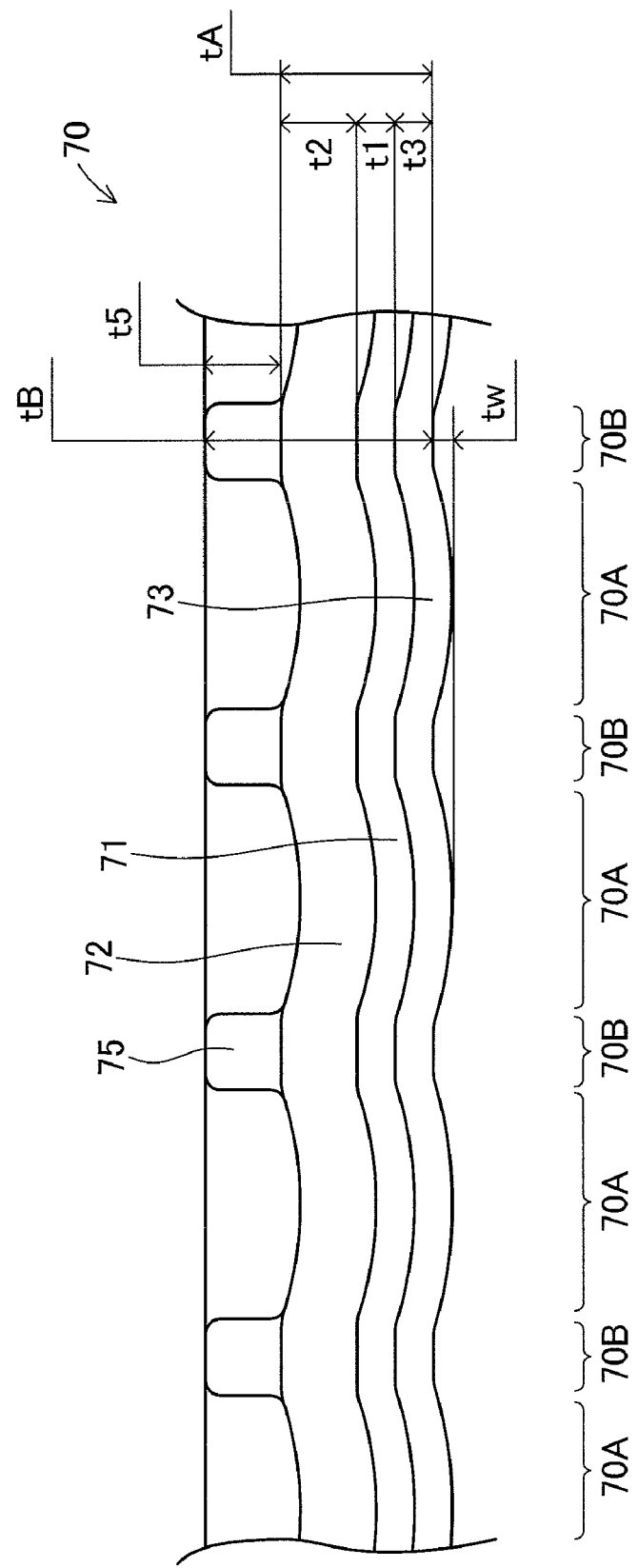
FIG. 16 is a partial sectional view of the thin plate member cut along a plane including 15-15 line shown in FIG. 15 and perpendicular to the plane of the thin plate member.

FIG. 16 is a partial sectional view of the thin plate member 70 cut along a plane that includes 15-15 line parallel to the side with the length b and is perpendicular to the plane of the thin plate member 70 in FIG. 15.

As understood from FIGS. 15 and 16, the thin plate member 70 includes a thin part 70A having a thickness of tA and a thick part 70B having a thickness of tB that is greater than the thickness tA. The thin part 70A corresponds to plural (specifically, 6×4+5×3=39) concave portions 74 (see FIG. 15) having a circular shape seen in a plane and arranged in the longitudinal direction and lateral direction with a predetermined rule (in a matrix, in a lattice). The thick part 70B corresponds to the remaining portion except for thirty-nine concave portions 74.

The diameter d of the concave portion 74 having a circular shape is not less than 1 mm and not more than 10 mm. Therefore, the ratio of the orthogonal projection area of the thick part 70B to the orthogonal projection area of the whole thin plate member 70 is 5% or more.

The thin part 70A is made by laminating only an electrolyte layer 71 made of a material same as that of the electrolyte layer 11, fuel electrode layer 72 formed on the upper surface of the electrolyte layer 71 and made of a material same as that of the fuel electrode layer 12, and air electrode layer 73 formed on the lower surface of the electrolyte layer 71 and made of a material same as that of the air electrode layer 13. The thick part 70B further has a warp correction layer 75, made of the material same as that of the warp correction layer 65, on the surface of the laminate member composed of the electrolyte layer 71, fuel electrode layer 72, and air electrode layer 73 which constitute the thin part 70A, at the side of the fuel electrode layer 72.

The thin plate member 70 is different from the thin plate member 60 in the shape of the thin part 70A, and is the same as the thin plate member 60 in the other points (thicknesses t1, t2, t3, t5, tw, etc.).

The thin plate member 70 that has the above-mentioned configuration and size and that can be used as a unit cell of the fuel cell A also provides the operation and effect same as those of the thin plate member 60.

Figure 17:
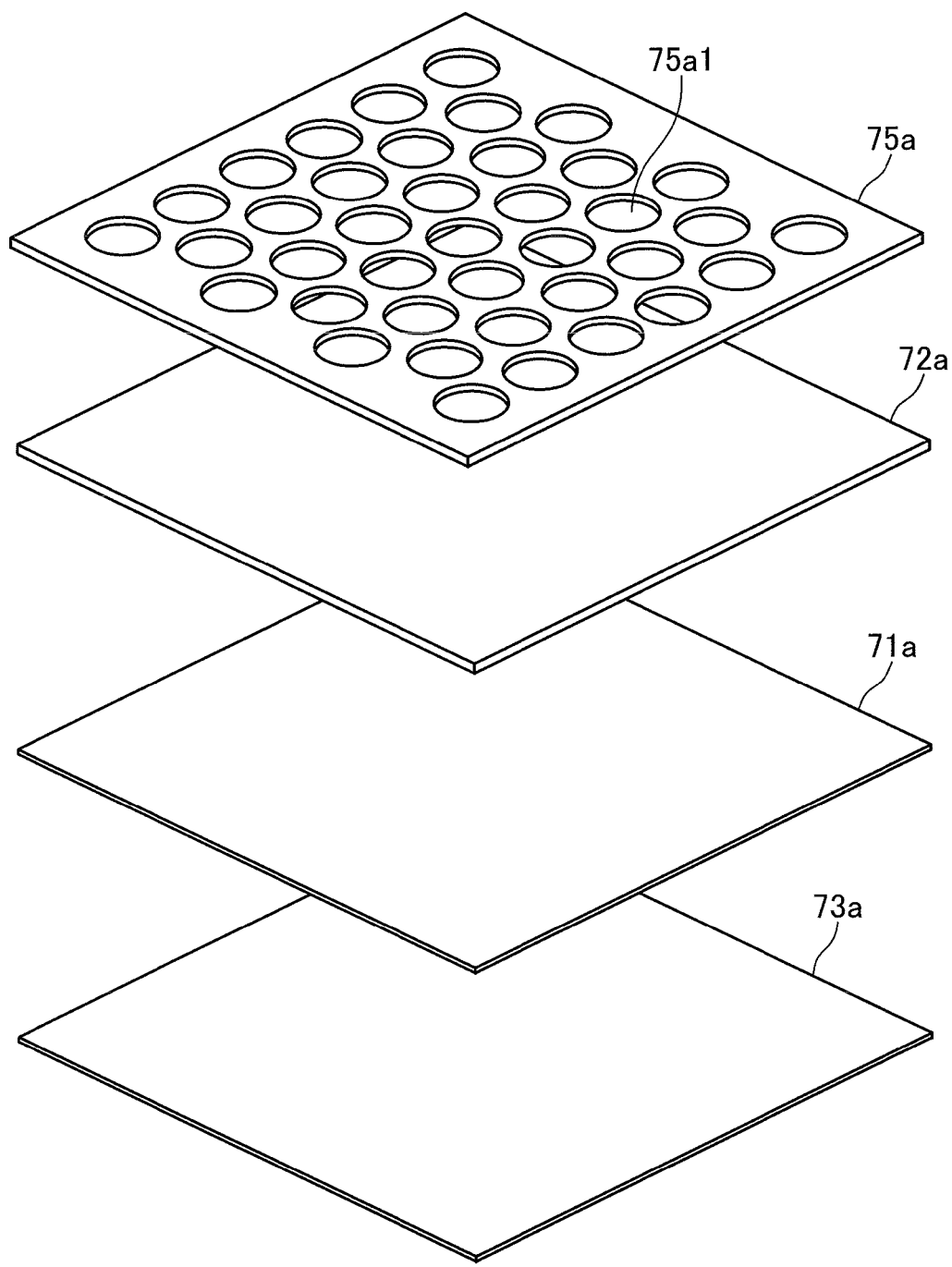
FIG. 17 is a view for explaining a manufacturing method of the thin plate member shown in FIG. 15.

Next, a manufacturing method of the thin plate member 70 shown in FIG. 15 will be explained with reference to FIG. 17. Firstly, a square ceramic sheet (serving as the electrolyte layer 71) 71a formed by a green sheet method is sintered for one hour at 1400° C.

Then, a square sheet (serving as the fuel electrode layer 72) 72a is formed on the upper surface of the sintered body by a printing method, and the resultant is sintered for one hour at 1400° C.

Next, a square ceramic sheet (serving as the warp correction layer 75) 75a having formed thereon thirty-nine circular penetrating windows 75a1 corresponding to the aforesaid thirty-nine concave portions 74 (see FIG. 15) seen in a plane is formed, by a printing method, on the upper surface of the sintered body, and the resultant is sintered for one hour at 1400° C.

A square sheet (a layer serving as the air electrode layer 73) 73a is similarly formed on the lower surface of the sintered body by a printing method, and the resultant is sintered for one hour at 1200° C. Thus, the thin plate member 70 shown in FIG. 15 is formed. It is to be noted that the warp on the thin part 70A is naturally formed during the process of forming the thin plate member 70 by sintering.

The sheets 72a and 75a may be formed on the upper surface of the ceramic sheet 71a by a printing method, both may be sintered for one hour at 1400° C., and then, the sheet 73a may be formed by the aforesaid method. Alternatively, the ceramic sheet 71a, sheet 72a and sheet 75a may integrally be laminated, and sintered for one hour at 1400° C., and then, the sheet 73a may be formed by the aforesaid method.

Second Modified Example of Third Embodiment

Figure 18:
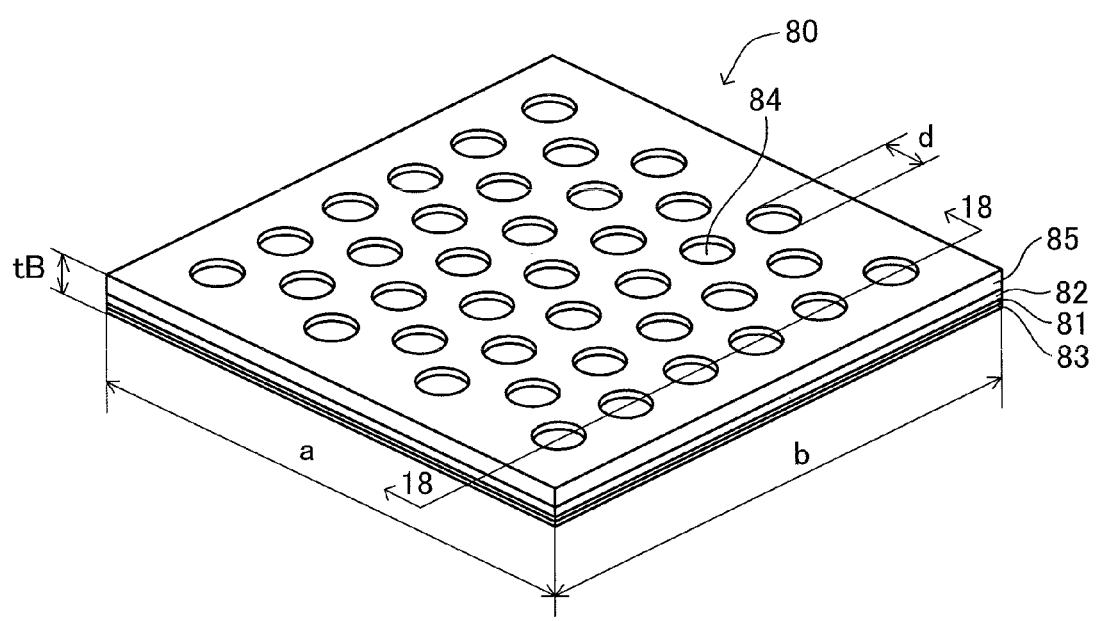
FIG. 18 is a perspective view of a thin plate member according to a second modified example of the third embodiment of the present invention.

Subsequently, a thin plate member 80 according to the second modified example of the third embodiment will be explained. The thin plate member 80 is also a square seen in a plane. As shown in FIG. 18 that is a perspective view, the length a of one side of the thin plate member 80 and the length b of the other side orthogonal to the one side are not less than 5 mm and not more than 200 mm.

Figure 19:
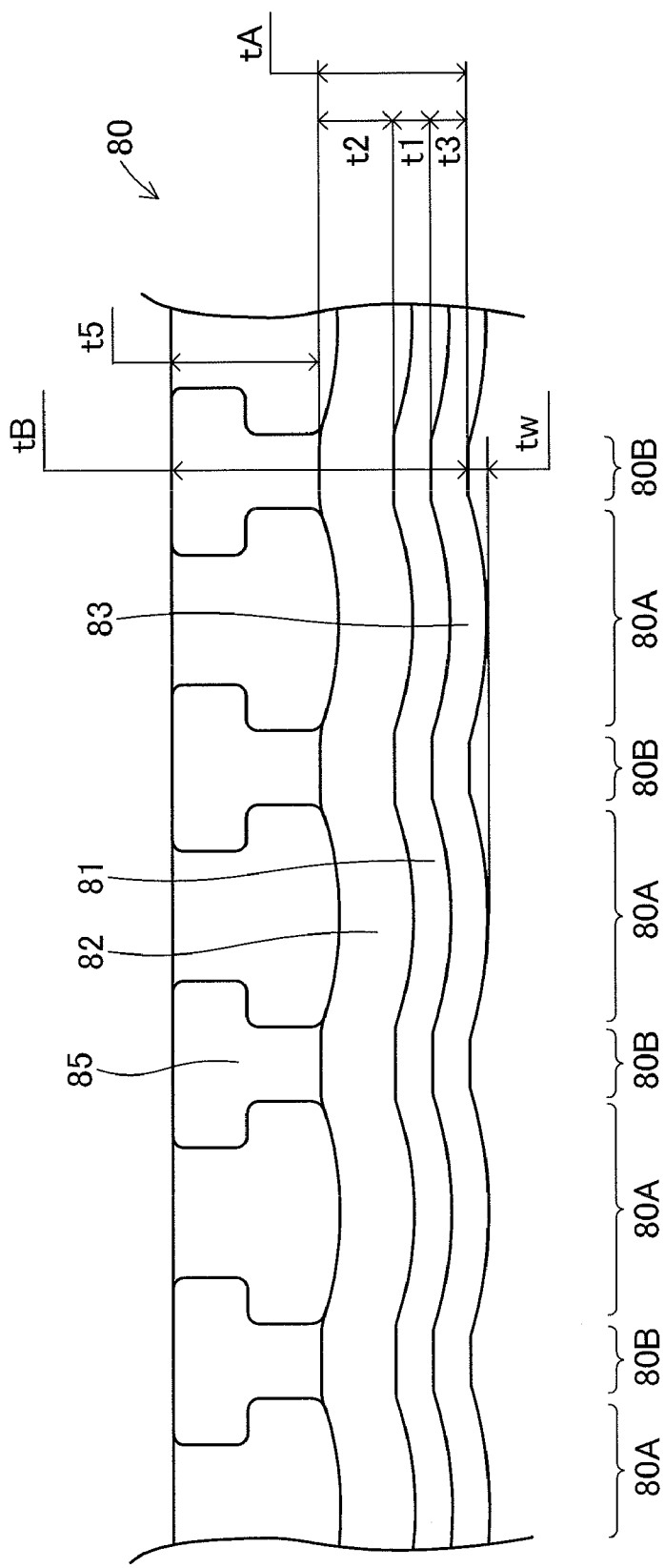
FIG. 19 is a partial sectional view of the thin plate member cut along a plane including 18-18 line shown in FIG. 18 and perpendicular to the plane of the thin plate member.

FIG. 19 is a partial sectional view of the thin plate member 80 cut along a plane that includes 18-18 line parallel to the side with the length b and is perpendicular to the plane of the thin plate member 80 in FIG. 18.

As understood from FIGS. 18 and 19, the thin plate member 80 includes a thin part 80A having a thickness of tA and a thick part 80B having a thickness of tB that is greater than the thickness tA. The thin part 80A corresponds to plural (specifically, 6×4+5×3=39) opening portions 84 (see FIG. 18) having a circular shape seen in a plane and arranged in the longitudinal direction and lateral direction with a predetermined rule (in a matrix, in a lattice). The thick part 80B corresponds to the remaining portion except for thirty-nine opening concave portions 84.

The diameter d of the opening portion 84 having a circular shape is not less than 1 mm and not more than 10 mm. Therefore, the ratio of the orthogonal projection area of the thick part 80B to the orthogonal projection area of the whole thin plate member 80 is 5% or more. It is to be noted that the diameter d of the opening portion 84 is smaller than the diameter d of the aforesaid concave portion 74.

In the thin plate member 80, the warp correction layer 85 has a section of T-like shape (sectional shape shown in FIG. 19). The thin plate member 80 is the same as the thin plate member 70 in the other points (material, thicknesses t1, t2, t3, tw, etc.).

The thin plate member 80 that has the above-mentioned configuration and size and that can be used as a unit cell of the fuel cell A also provides the operation and effect same as those of the thin plate member 60.

Figure 20:
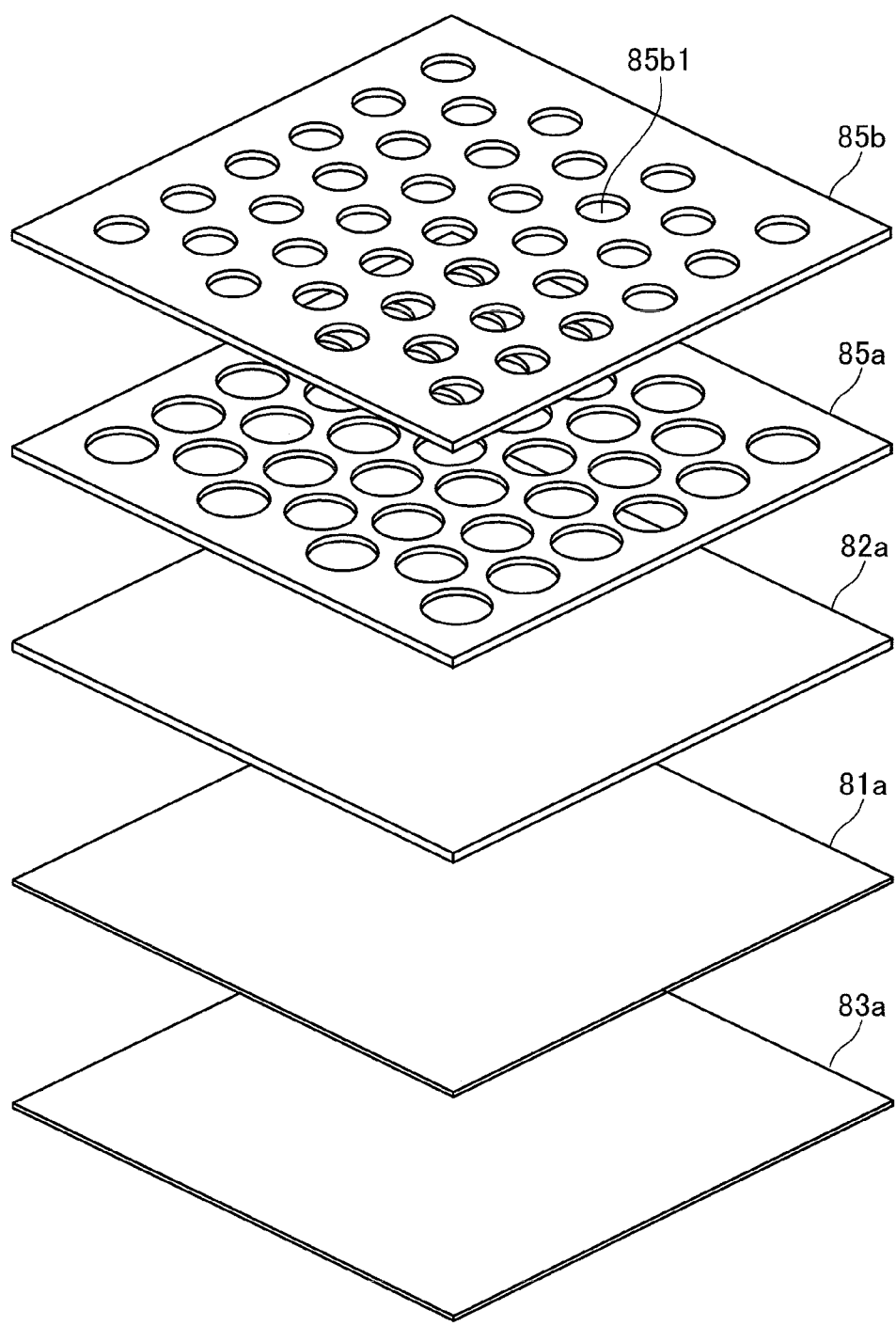
FIG. 20 is a view for explaining a manufacturing method of the thin plate member shown in FIG. 18.

Next, a manufacturing method of the thin plate member 80 shown in FIG. 18 will be explained with reference to FIG. 20. Firstly, a square ceramic sheet (serving as the electrolyte layer 81) 81a formed by a green sheet method is sintered for one hour at 1400° C.

Then, a square sheet (serving as the fuel electrode layer 82) 82a is formed on the upper surface of the sintered body by a printing method, and the resultant is sintered for one hour at 1400° C.

Next, a square ceramic sheet (serving as the warp correction layer 85) 85a that is the same as the square sheet 75a in the first modified example of the third embodiment is formed, by a printing method, on the upper surface of the sintered body. A square sheet (serving as the warp correction layer 85) 85b formed with a green sheet method and having formed thereon thirty-nine circular penetrating windows 85b1 corresponding to the aforesaid thirty-nine opening portions 84 in the thin plate member 80 seen in a plane is integrally laminated on the sheet 85a, and the resultant is sintered for one hour at 1400° C.

A square sheet (a layer serving as the air electrode layer 83) 83a is formed on the lower surface of the sintered body by a printing method, and the resultant is sintered for one hour at 1200° C. Thus, the thin plate member 80 shown in FIG. 18 is formed. It is to be noted that the warp on the thin part 80A is naturally formed during the process of forming the thin plate member 80 by sintering.

The sheets 82a, 85a and 85b may be formed on the upper surface of the ceramic sheet 81a by a printing method or sheet laminating method, both may be sintered for one hour at 1400° C., and then, the sheet 83a may be formed by the aforesaid method. Alternatively, the ceramic sheet 81a, sheet 82a, sheet 85a and sheet 85b may integrally be laminated, and sintered for one hour at 1400° C., and then, the sheet 83a may be formed by the aforesaid method.

Other Modified Examples

Figure 21:
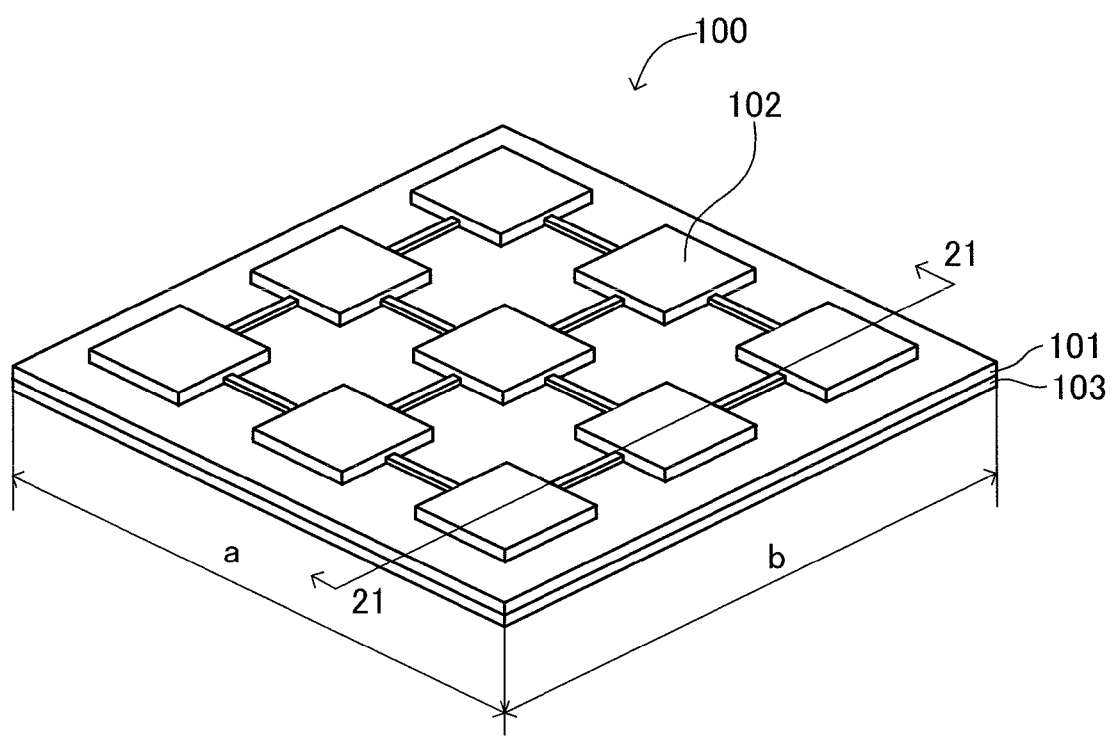
FIG. 21 is a perspective view of a thin plate member according to another modified example of the present invention.
Figure 22:
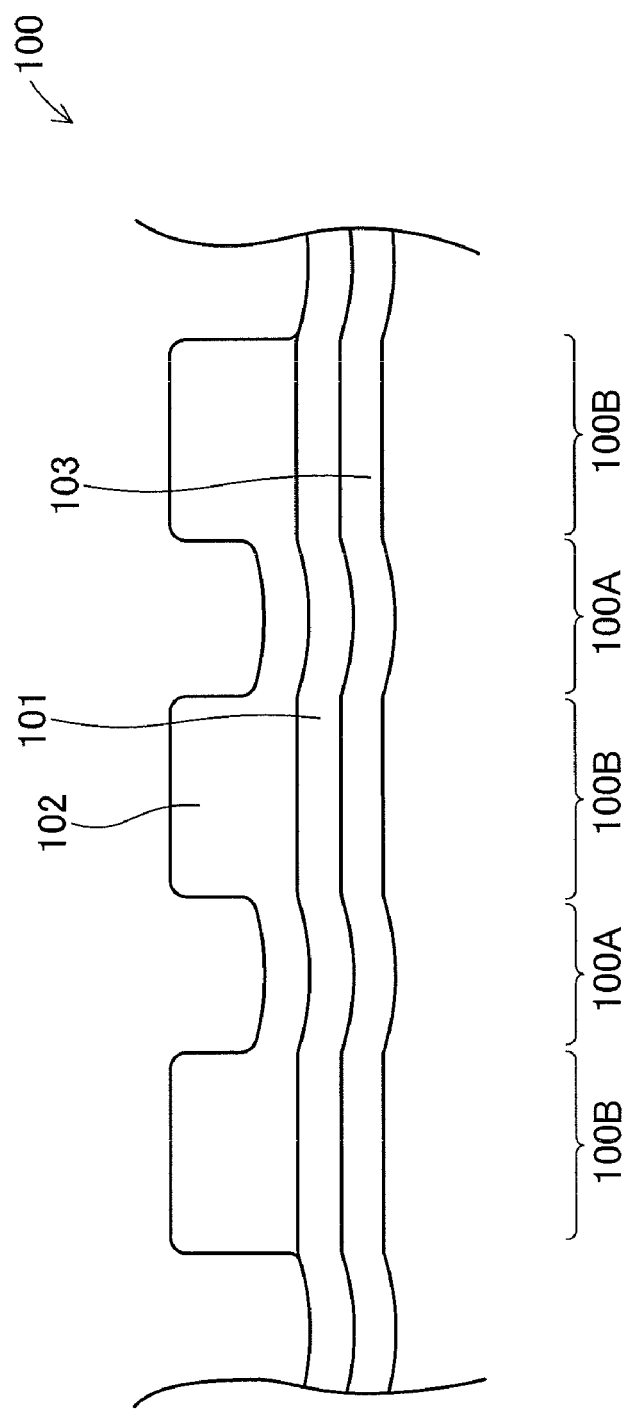
FIG. 22 is a partial sectional view of the thin plate member cut along a plane including 21-21 line shown in FIG. 21 and perpendicular to the plane of the thin plate member.

The thin plate member according to the present invention may be a thin plate member 100 shown in FIG. 21 that is a perspective view. FIG. 22 is a partial sectional view of the thin plate member 100 cut along a plane including a line 21-21 parallel to the side with the length b and perpendicular to the plane of the thin plate member 100. The thin plate member 100 is also a square seen in a plane.

The thin plate member 100 is similar to the thin plate member 50 according to the second embodiment. The thin part 100A and the thick part 100B are made by laminating an electrolyte layer 101, fuel electrode layer 102, and air electrode layer 103, wherein the thickness of the fuel electrode layer 102 at the thick part 100B is greater than the thickness of the fuel electrode layer 102 at the thin part 100A. The materials of the electrolyte layer 101, fuel electrode layer 102, and air electrode layer 103 are the same as those in the first embodiment.

The thickness of the thin part 100A is not less than 5 μm and not more than 100 μm, and the difference between the thickness of the thick part 100B and the thickness of the thin part 100A (e.g., the difference between the thickness of the fuel electrode layer 102 at the thick part 100B and the thickness of the fuel electrode layer 102 at the thin part 100A) is not less than 10 μm and not more than 300 μm.

The thick part 100B corresponds to nine convex portions having a square shape seen in a plane and arranged in the longitudinal direction and lateral direction. Each of the thin parts 100A warps in the direction (specifically, toward the air electrode layer 103) perpendicular to the plane of the thin plate member 100. The orthogonal projection area of each of the thin parts 100A seen in a plane is not less than 1 mm$^2$ and not more than 100 mm$^2$, and the height of the warp in the direction perpendicular to the plane of the thin plate member 100 is not less than 1 μm and not more than 100 μm.

Figure 23:
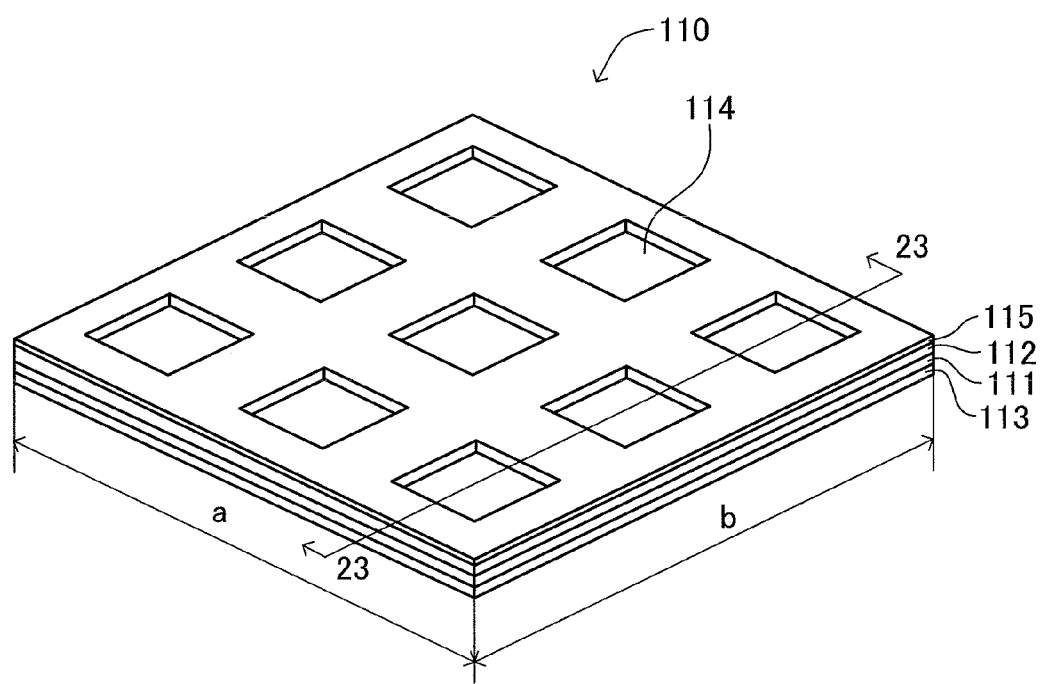
FIG. 23 is a perspective view of a thin plate member according to another modified example of the present invention.
Figure 24:
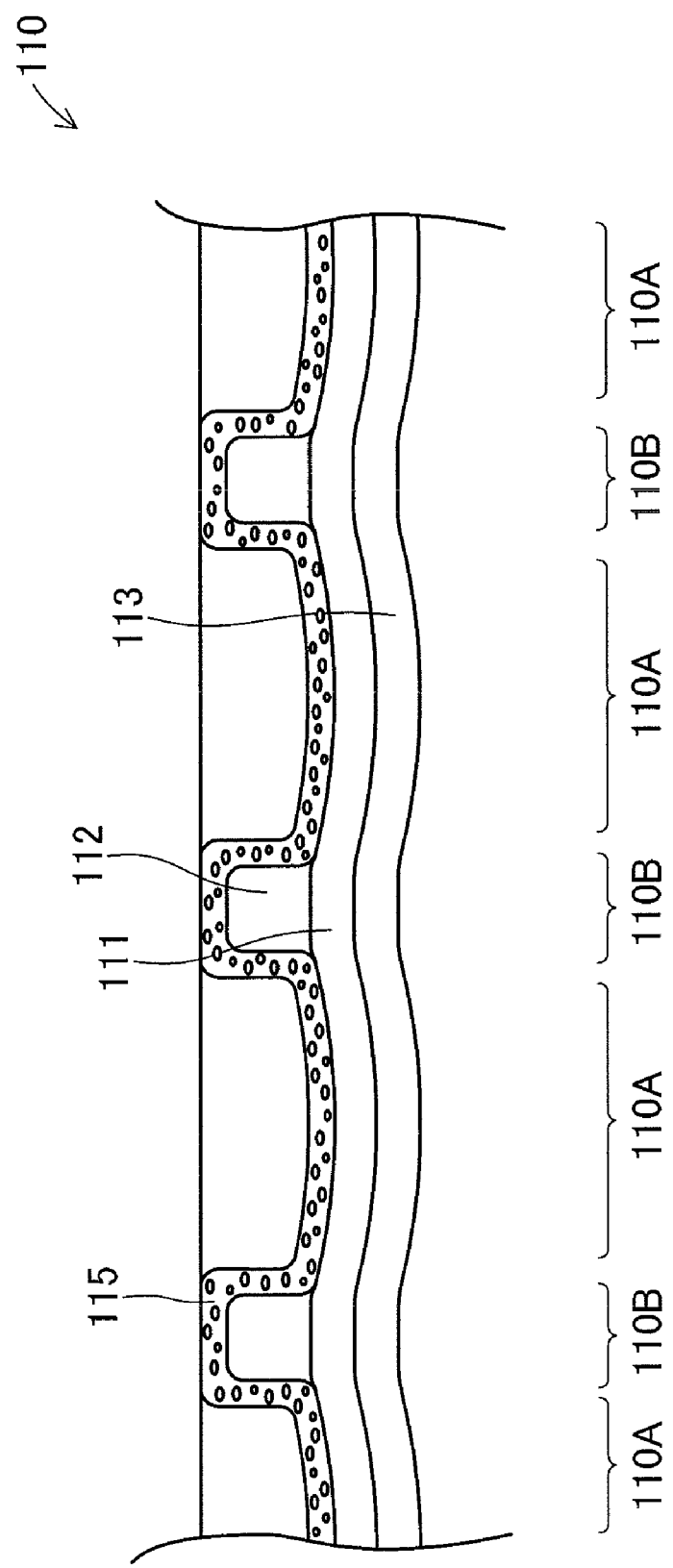
FIG. 24 is a partial sectional view of the thin plate member cut along a plane including 23-23 line shown in FIG. 23 and perpendicular to the plane of the thin plate member.

Further, the thin plate member according to the present invention may be a thin plate member 110 shown in FIG. 23 that is a perspective view. FIG. 24 is a partial sectional view of the thin plate member 110 in FIG. 23 cut along a plane that includes a line 23-23 parallel to the side with the length b and is perpendicular to the plane of the thin plate member 110. The thin plate member 110 is also a square seen in a plane.

The thin plate member 110 is similar to the thin plate member 70 according to the third embodiment. The thin part 110A is made by laminating a warp correction layer 115 on the surface of a laminate member composed of an electrolyte layer 111, and air electrode layer 113, at the side of the electrolyte layer 111. The thick part 110B is made by laminating a warp correction layer 115 on the surface of a laminate member composed of a fuel electrode layer 112, the electrolyte layer 111, and air electrode layer 113, at the side of the fuel electrode layer 112.

As described above, the thick part 110B is thicker than the thin part 110A by the thickness of the fuel electrode layer 112, and the warp correction layer 115 is laminated all over the surface seen in a plane. The warp correction layer 115 is made of a porous material, whereby the thermal expansion coefficient of the warp correction layer 115 is smaller than the thermal expansion coefficient of the electrolyte layer 111. Zircon may be used for the material of the warp correction layer 115, for example. The materials of the electrolyte layer 111, fuel electrode layer 112, and air electrode layer 113 are the same as those in the first embodiment.

The thickness of the thin part 110A is not less than 5 μm and not more than 100 μm, and the difference between the thickness of the thick part 10B and the thickness of the thin part 110A (e.g., the difference between the thickness of the fuel electrode layer 112) is not less than 10 μm and not more than 300 μm.

The thin part 110A (i.e., where the fuel electrode layer 112 is not present) corresponds to nine concave portions 114 having a square shape seen in a plane and arranged in the longitudinal direction and lateral direction. Each of the thin parts 110A warps in the direction (specifically, toward the air electrode layer 113) perpendicular to the plane of the thin plate member 110. The orthogonal projection area of each of the thin parts 110A seen in a plane is not less than 1 mm$^2$ and not more than 100 mm$^2$, and the height of the warp in the direction perpendicular to the plane of the thin plate member 110 is not less than 1 μm and not more than 100 μm.

Figure 25:
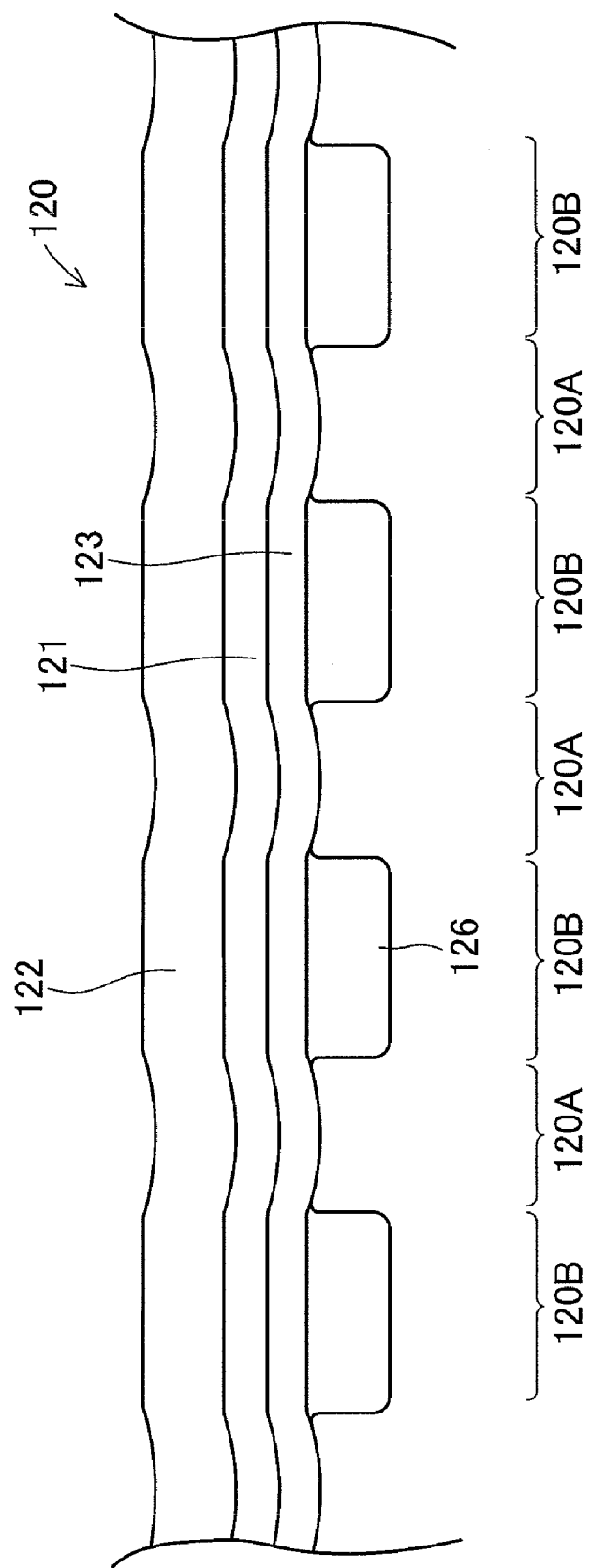
FIG. 25 is a partial sectional view of a thin plate member according to another modified example.

Further, the thin plate member according to the present invention may be a thin plate member 120 shown in FIG. 25 that is a partial sectional view. The thin plate member 120 is also a square seen in a plane.

The thin plate member 120 is similar to the thin plate member 60 according to the third embodiment. The thin part 120A is made by laminating an electrolyte layer 121, fuel electrode layer 122, and air electrode layer 123. The thick part 120B is made by laminating a warp correction layer 126 on the surface of a laminate member composed of the electrolyte layer 121, fuel electrode layer 122, and air electrode layer 123, at the side of the fuel electrode layer 123. As described above, the thin plate member 120 corresponds to the one wherein the warp correction layer is laminated at the side of the air electrode layer, not at the side of the fuel electrode layer, in the thin plate member 60. The thick part 120B is greater than the thin part 120A by the thickness of the warp correction layer 126.

The thermal expansion coefficient of the warp correction layer 126 is greater than the thermal expansion coefficient of the electrolyte layer 121 (and air electrode layer 123). Silver or platinum can be used for the material of the warp correction layer 126. Thus, the deformation direction of the thin plate member 120 based upon the internal stress caused by the difference in the thermal expansion coefficient between the electrolyte layer 121 and the fuel electrode layer 122 and the deformation direction of the thin plate member 120 based upon the internal stress caused by the difference in the thermal expansion coefficient between the air electrode layer 123 and the warp correction layer 126 can be made reverse to each other. As a result, the deformation of the whole thin plate member 120 with respect to the internal stress caused by the difference in the thermal expansion coefficient between layers can be reduced. The materials of the electrolyte layer 121, fuel electrode layer 122, and air electrode layer 123 are the same as those in the first embodiment.

The thickness of the thin part 120A is not less than 5 μm and not more than 100 μm, and the difference (i.e., the thickness of the warp correction layer 126) between the thickness of the thick part 120B and the thickness of the thin part 120A is not less than 1 μm and not more than 100 μm.

The thin part 120A (i.e., where the warp correction layer 126 is not present) warps in the direction (specifically, toward the air electrode layer 123) perpendicular to the plane of the thin plate member 120. The orthogonal projection area of each of the thin parts 120A seen in a plane is not less than 1 mm$^2$ and not more than 100 mm$^2$, and the height of the warp in the direction perpendicular to the plane of the thin plate member 120 is not less than 1 μm and not more than 100 μm.

Figure 26:
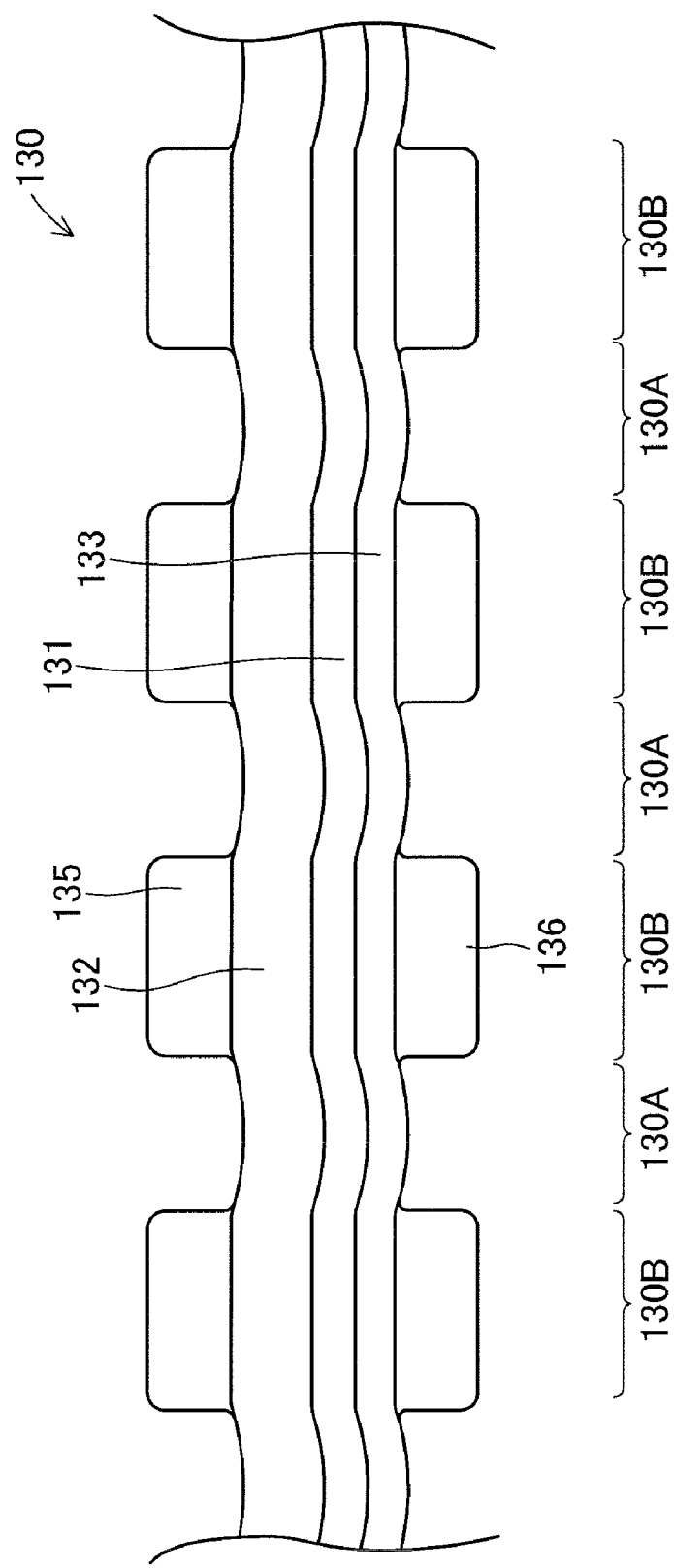
FIG. 26 is a partial sectional view of a thin plate member according to another modified example.

Further, the thin plate member according to the present invention may be a thin plate member 130 shown in FIG. 26 that is a partial sectional view. The thin plate member 130 is also a square seen in a plane.

The thin plate member 130 is similar to the thin plate member 60 according to the third embodiment. The thin part 130A is made by laminating an electrolyte layer 131, fuel electrode layer 132, and air electrode layer 133. The thick part 130B is made by laminating warp correction layers 135 and 136 on the surfaces of a laminate member composed of the electrolyte layer 131, fuel electrode layer 132, and air electrode layer 133 both at the side of the fuel electrode layer 132 and at the side of the air electrode layer 133. As described above, the thin plate member 130A corresponds to the one wherein the warp correction layer is further laminated at the side of the fuel electrode layer, in the thin plate member 120.

The thick part 130B is greater than the thin part 130A by the total sum of the thicknesses of the warp correction layers 135 and 136.

The thermal expansion coefficient of the warp correction layer 135 is smaller than the thermal expansion coefficient of the electrolyte layer 131 (and fuel electrode layer 132), and the thermal expansion coefficient of the warp correction layer 136 is greater than the thermal expansion coefficient of the electrolyte layer 131 (and air electrode layer 133). Zircon can be used for the material of the warp correction layer 135, for example. Silver or platinum can be used for the material of the warp correction layer 136, for example.

By virtue of this configuration, the operation and effect of the thin plate member 60 according to the third embodiment is superimposed on the operation and effect of the thin plate member 120 shown in FIG. 25, whereby the deformation of the whole thin plate member 130 with respect to the internal stress caused by the difference in the thermal expansion coefficient between layers can further be reduced. The materials of the electrolyte layer 131, fuel electrode layer 132, and air electrode layer 133 are the same as those in the first embodiment.

The thickness of the thin part 130A is not less than 5 μm and not more than 100 μm, and each of the thickness of the warp correction layers 135 and 136 is not less than 10 μm and not more than 100 μm. The thin part 130A (i.e., where the warp correction layers 135 and 136 are not present) warps in the direction (specifically, toward the air electrode layer 133) perpendicular to the plane of the thin plate member 130. The orthogonal projection area of each of the thin parts 130A seen in a plane is not less than 1 mm$^2$ and not more than 100 mm$^2$, and the height of the warp in the direction perpendicular to the plane of the thin plate member 130 is not less than 1 μm and not more than 100 μm.

Figure 27:
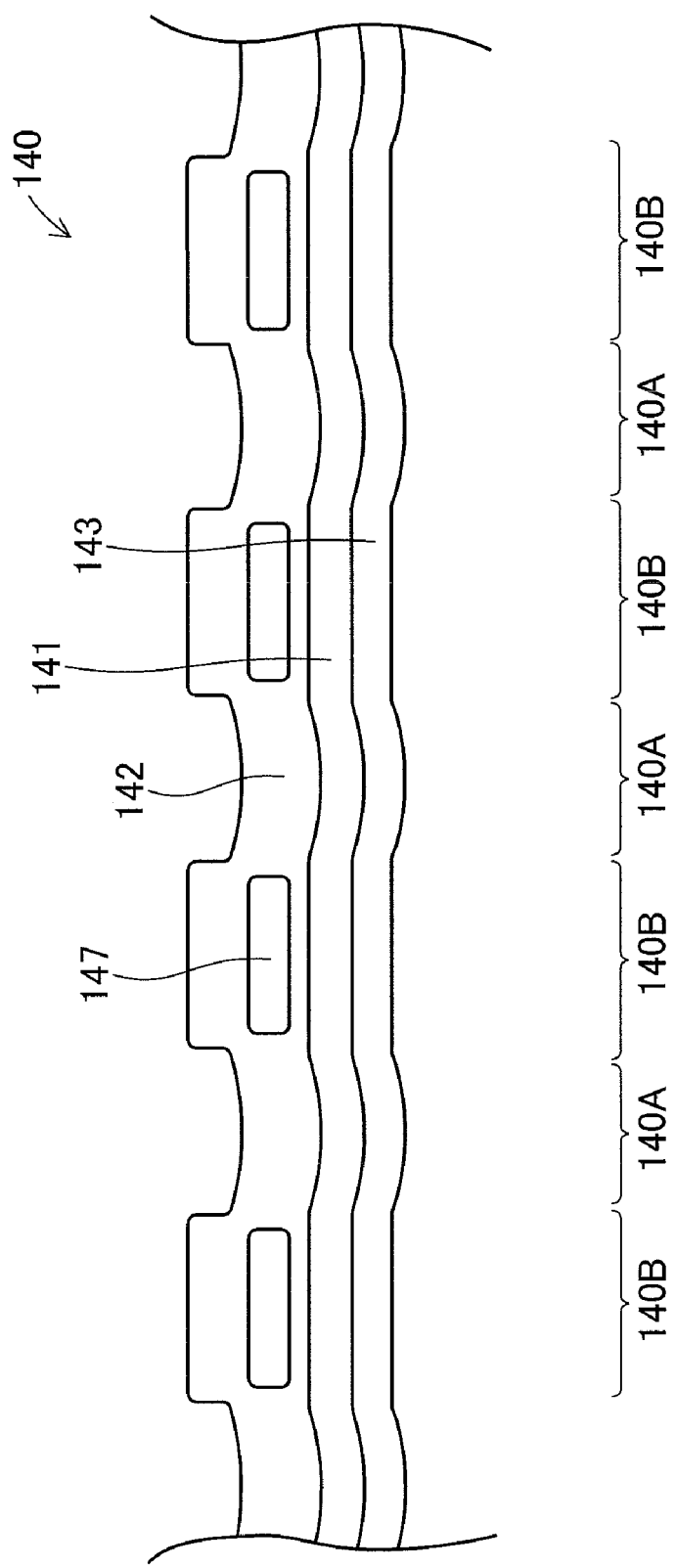
FIG. 27 is a partial sectional view of a thin plate member according to another modified example.

Further, the thin plate member according to the present invention may be a thin plate member 140 shown in FIG. 27 that is a partial sectional view. The thin plate member 140 is also a square seen in a plane.

The thin plate member 140 is similar to the thin plate member 60 according to the third embodiment. The thin part 140A is made by laminating an electrolyte layer 141, fuel electrode layer 142, and air electrode layer 143. The thick part 140B is made by embedding a warp correction layer 147 in the fuel electrode layer 142 of a laminate member composed of the electrolyte layer 141, fuel electrode layer 142, and air electrode layer 143. As described above, the thin plate member 140 corresponds to the one wherein the warp correction layer is embedded into the fuel electrode layer in the thin plate member 60, instead of laminating the warp correction layer on the surface of the laminate member at the side of the fuel electrode layer. The thick part 140B is greater than the thin part 140A by the thickness of the warp correction layer 147.

The thermal expansion coefficient of the warp correction layer 147 is smaller than the thermal expansion coefficient of the electrolyte layer 141 (and fuel electrode layer 142). Zircon can be used for the material of the warp correction layer 147, for example. Thus, the deformation direction of the thin plate member 140 based upon the internal stress caused by the difference in the thermal expansion coefficient between the electrolyte layer 141 and the fuel electrode layer 142 and the deformation direction of the thin plate member 140 based upon the internal stress caused by the difference in the thermal expansion coefficient between the fuel electrode layer 142 and the warp correction layer 147 can be made reverse to each other, like the third embodiment. As a result, the deformation of the whole thin plate member 140 with respect to the internal stress caused by the difference in the thermal expansion coefficient between layers can be reduced. The materials of the electrolyte layer 141, fuel electrode layer 142, and air electrode layer 143 are the same as those in the first embodiment.

The thickness of the thin part 140A is not less than 5 µm and not more than 100 µm, and the difference (i.e., the thickness of the warp correction layer 147) between the thickness of the thick part 140B and the thickness of the thin part 140A is not less than 10 µm and not more than 100 µm.

The thin part 140A (i.e., where the warp correction layer 147 is not present) warps in the direction (specifically, toward the air electrode layer 143) perpendicular to the plane of the thin plate member 140. The orthogonal projection area of each of the thin parts 140A seen in a plane is not less than 1 mm$^2$ and not more than 100 mm$^2$, and the height of the warp in the direction perpendicular to the plane of the thin plate member 140 is not less than 1 µm and not more than 100 µm.

Figure 28:
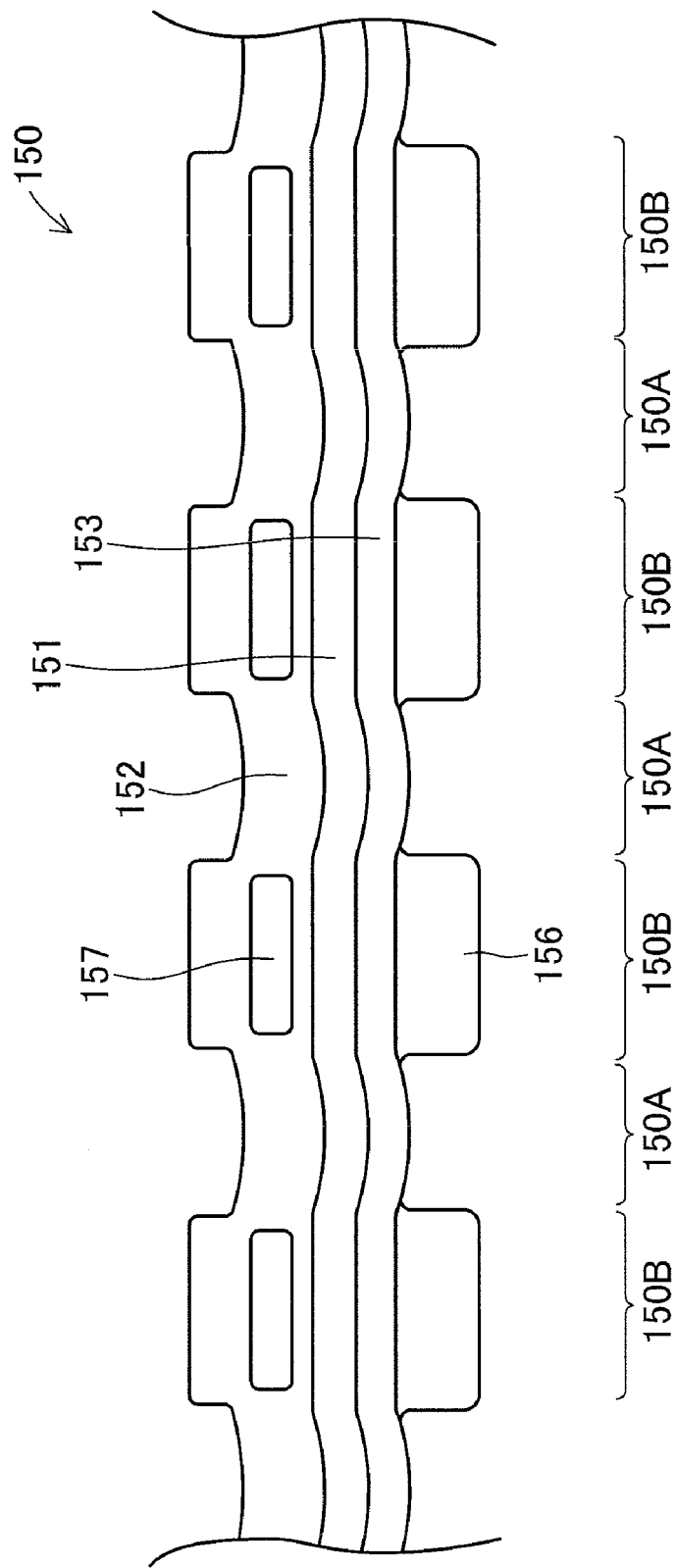
FIG. 28 is a partial sectional view of a thin plate member according to another modified example.

Further, the thin plate member according to the present invention may be a thin plate member 150 shown in FIG. 28 that is a partial sectional view. The thin plate member 150 is also a square seen in a plane.

The thin plate member 150 is similar to the thin plate member 60 according to the third embodiment. The thin part 150A is made by laminating an electrolyte layer 151, fuel electrode layer 152, and air electrode layer 153. The thick part 150B is made by laminating a warp correction layer 156 on the surface of the laminate member composed of the electrolyte layer 151, fuel electrode layer 152, and air electrode layer 153, at the side of the air electrode layer 153, and by embedding a warp correction layer 157 in the fuel electrode layer 152 of the laminate member. As described above, the thin plate member 150 corresponds to the one wherein the warp correction layer is further laminated at the side of the air electrode layer of the thin plate member 140. The thick part 150B is greater than the thin part 140A by the total sum of the thicknesses of the warp correction layers 156 and 157.

The thermal expansion coefficient of the warp correction layer 157 is smaller than the thermal expansion coefficient of the electrolyte layer 151 (and fuel electrode layer 152), and the thermal expansion coefficient of the warp correction layer 156 is greater than the thermal expansion coefficient of the electrolyte layer 151 (and air electrode layer 153). Zircon can be used for the material of the warp correction layer 157, for example. Silver or platinum can be used for the material of the warp correction layer 156, for example.

By virtue of this configuration, the operation and effect of the thin plate member 140 shown in FIG. 27 is superimposed on the operation and effect of the thin plate member 120 shown in FIG. 25, whereby the deformation of the whole thin plate member 150 with respect to the internal stress caused by the difference in the thermal expansion coefficient between layers can further be reduced. The materials of the electrolyte layer 151, fuel electrode layer 152, and air electrode layer 153 are the same as those in the first embodiment.

The thickness of the thin part 150A is not less than 5 µm and not more than 100 µm, and each of the thickness of the warp correction layers 156 and 157 is not less than 10 µm and not more than 100 µm. The thin part 150A (i.e., where the warp correction layers 156 and 157 are not present) warps in the direction (specifically, toward the air electrode layer 153) perpendicular to the plane of the thin plate member 150. The orthogonal projection area of each of the thin parts 150A seen in a plane is not less than 1 mm$^2$ and not more than 100 mm$^2$, and the height of the warp in the direction perpendicular to the plane of the thin plate member 150 is not less than 1 µm and not more than 100 µm.

Figure 29:
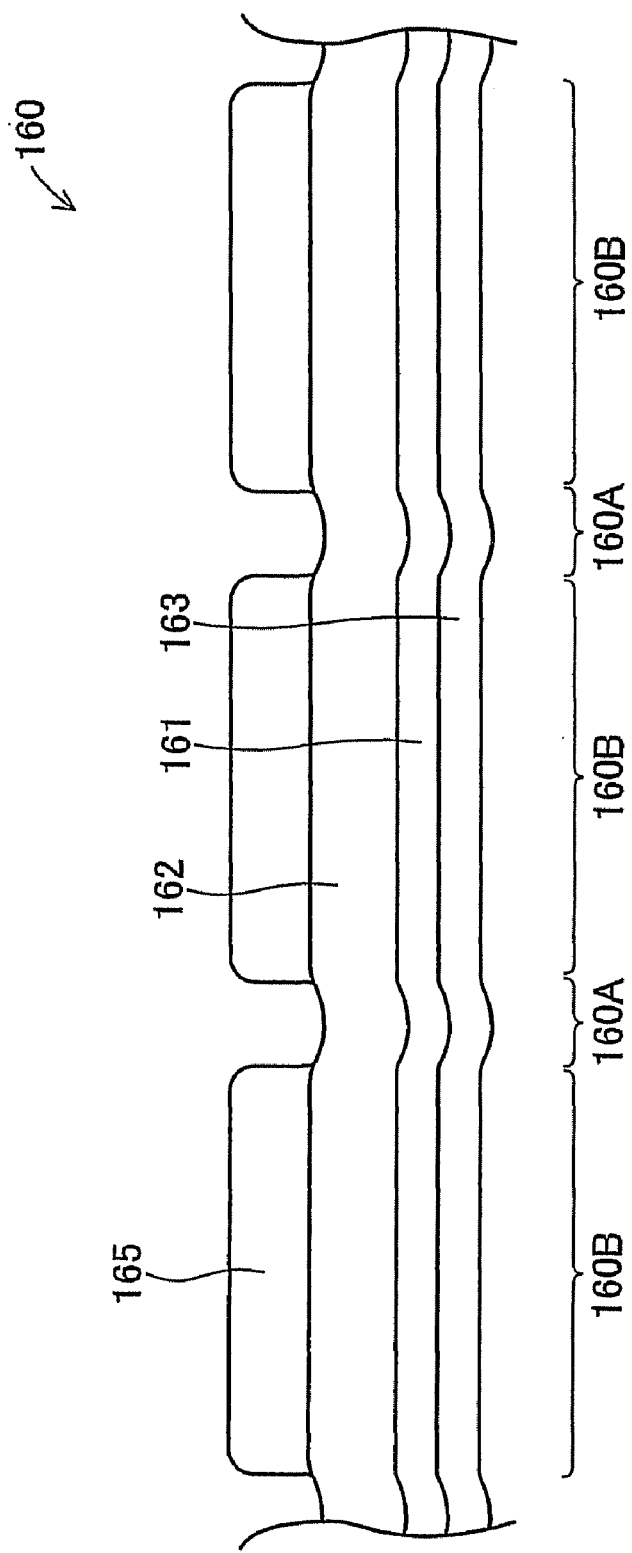
FIG. 29 is a partial sectional view of a thin plate member according to another modified example.

Further, the thin plate member according to the present invention may be a thin plate member 160 shown in FIG. 29 that is a partial sectional view. The thin plate member 160 is also a square seen in a plane.

The thin plate member 160 is similar to the thin plate member 60 according to the third embodiment. In the thin plate member 160, an electrolyte layer 161, fuel electrode layer 162, air electrode layer 163, warp correction layer 165, thin part 160A and thick part 160B respectively correspond to the electrolyte layer 61, fuel electrode layer 62, air electrode layer 63, warp correction layer 65, thin part 60A, and thick part 60B of the thin plate member 60 according to the third embodiment shown in FIG. 13. The thin plate member 160 is different from the thin plate member 60 only in that the area ratio of the thick part to the total orthogonal projection area seen in a plane is greater than that of the thin plate member 60, and the other points are the same as those of the thin plate member 60.

As explained above, the thin plate member according to the embodiments and modified examples has a thin part and thick part composed of two or more types of layers laminated, each layer being made of a material having different thermal expansion coefficient, and the thin part has a shape warping in the direction perpendicular to the plane of the thin plate member. Therefore, the thin part can be made extremely thin, whereby the internal electrical resistance (in particular, the internal electrical resistance of the solid electrolyte layer) of the thin part can be reduced. Further, providing the thick part and forming the warp on the thin part can provide a thin plate member that is difficult to be deformed with respect to the internal stress caused by the difference in the thermal expansion coefficient between layers.

Figure 31:
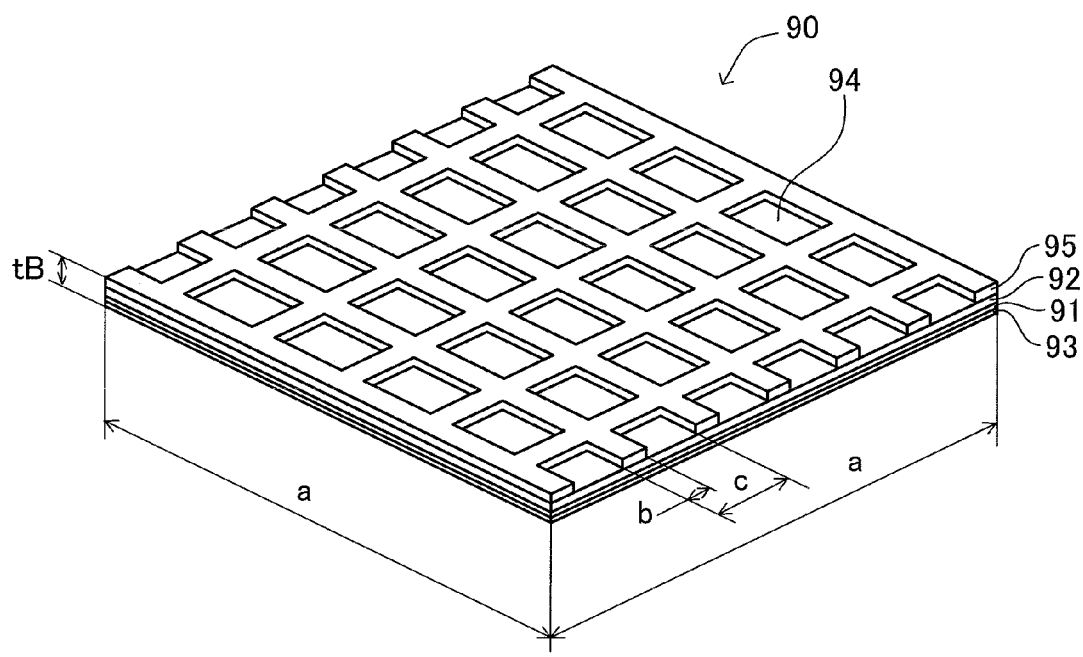
FIG. 31 is a thin plate member similar to the thin plate member shown in FIG. 12.

FIG. 30 shows a result of the experiment in which the warping amount of the whole thin plate member 90 shown in FIG. 31 (hereinafter referred to as "substrate") for various combinations of the thickness of the thin part and the thickness of the thick part is measured. The thin plate member 90 is similar to the thin plate member 60 according to the third embodiment, wherein the thin part is made by laminating an electrolyte layer 91, fuel electrode layer 92, and air electrode layer 93, and the thick part is made by laminating a warp correction layer 95 on the surface of the laminate member composed of the electrolyte layer 91, fuel electrode layer 92, and air electrode layer 93, which constitute the thin part, at the side of the fuel electrode layer 92. The thin plate member 90 has a square shape, seen in a plane, in which the length a of one side is 50 mm.

The warp correction layer 95 has a shape of lattice arranged in the longitudinal direction and lateral direction at equally spaced intervals. Therefore, the thin part corresponds to plural rectangular concave portions 94 seen in a plane. The thick part corresponds to the portion except for the plural concave portions 94. The width b of the frame of the lattice, seen in a plane, of the warp correction layer 95 is 500 µm and the pitch c of the lattice is 3 mm.

The followings were found from the result of the experiment shown in FIG. 30.

1. When the thickness of the thin part was less than 5 µm, crack was produced all over the substrate due to thermal stress. This is considered to be based upon the fact that the substrate cannot withstand the warp correcting stress by the warp correction layer 95 with the thin part having a thickness less than 5 µm.

2. When the thickness of the thin part was not less than 5 µm, test pieces having various thicknesses could be formed. However, when the thickness of the thin part exceeded 100 µm, the effect of reducing the warp of the substrate caused by the deformation (warp) of the thin part could not be confirmed, since the substrate has sufficient strength.

3. When the difference between the thin part and the thick part exceeded 300 μm, crack was produced on the thin part. This can be considered to be based upon the fact that the deformation of the thin part is prevented since the thick part has sufficient strength, and hence, stress is concentrated on the boundary between the thin part and the thick part, i.e., at the edge of the thin part.

From the above, the followings were found.

1. It is preferable that the thickness of the thin part is not less than 5 μm and not more than 100 μm, and the difference between the thick part and the thin part in thickness is not less than 10 μm and not more than 300 μm.

2. It was found that, even very small warping amount of the thin part was effective for suppressing the deformation (warping) of the whole substrate, and when the warping amount of the thin part exceeded 100 μm, crack was rather produced from the edge portion of the thin part, so that the thin plate member was finally destroyed.

The present invention is not limited to the aforesaid each embodiment, and various modifications are possible within a scope of the present invention. For example, each of the thin plate members may be made of an ordinary ceramic, such as alumina. Further, each of the thin plate members may be ceramic having high thermal shock resistance, such as silicon nitride or silicon carbide, and may be yttria partially stabilized zirconia. Further, the shape of each of the thin plate members seen in a plane is not limited to have a square or rectangular shape, but may have a shape of regular polygon including these, polygon, circle, ellipse, and the like.

In each of the thin plate members, the sheet serving as the fuel electrode layer can be made of platinum, platinum-zirconia cermet, platinum-cerium oxide cermet, ruthenium, ruthenium-zirconia cermet, and the like. The sheet serving as the air electrode layer can be made of perovskite complex oxide containing lanthanum (e.g., the aforesaid lanthanum manganite, lanthanum cobaltite). The lanthanum cobaltite and lanthanum manganite may be doped with strontium, calcium, chrome, cobalt (in the case of lanthanum manganite), iron, nickel, aluminum, or the like. Further, it may be palladium, platinum, ruthenium, platinum-zirconia cermet, palladium-zirconia cermet, ruthenium-zirconia cermet, platinum-cerium oxide cermet, palladium-cerium oxide cermet, and ruthenium-cerium oxide cermet.

Although each of the thin plate members is a laminate member having three layers (or four layers), it may be a laminate member having four or more layers (or five or more layers) (e.g., four to seven layers).

What is claimed is:

1. A plate member that is formed by sintering and contains at least a ceramic layer, comprising:
   a thin part that is a portion of the plate member, and is made by laminating two or more types of layers, each layer being made of a material having a predetermined thermal expansion coefficient, wherein the thermal expansion coefficient of one layer is smaller than the thermal expansion coefficient of another layer; and
   a thick part that is a portion of the plate member, and is made by laminating plural layers including at least all of the layers constituting the thin part, and has a thickness greater than the thickness of the thin part,
   wherein the thin part has a first surface that is concave and an opposed second surface that is convex such that the thin part is warped in only a single direction perpendicular to the plane of the plate member.

2. A plate member according to claim 1, wherein the thickness of the thin part is not less than 5 μm and not more than 100 μm, and the difference between the thickness of the thick part and the thickness of the thin part is not less than 10 μm and not more than 300 μm.

3. A plate member according to claim 2, wherein one or plural thin parts are provided, and
   an orthogonal projection area of each thin part with respect to the direction perpendicular to the plane of the thin plate member is not less than 1 mm$^2$ and not more than 100 mm$^2$, and the height of the warp on each thin part in the direction perpendicular to the plane is not less than 1 μm and not more than 100 μm.

4. A plate member according to claim 3, wherein the orthogonal projection shape of each thin part with respect to the direction perpendicular to the plane of the plate member is a circle, ellipse, square, or rectangle, wherein the diameter of the circle, major axis of the ellipse, the length of one side of the square, or the length of the long side of the rectangle is not less than 1 mm and not more than 10 mm.

5. A plate member according to claim 1, wherein
   the thin part and the thick part are made by laminating a solid electrolyte layer serving as the ceramic layer, a fuel electrode layer formed on one surface of the solid electrolyte layer, and an air electrode layer formed on the other surface of the solid electrolyte layer, wherein
   the thickness of any one of layers in the thick part is greater than the thickness of the corresponding layer in the thin part.

6. A plate member according to claim 5, wherein
   the thickness of the solid electrolyte layer at the thick part is greater than the thickness of the solid electrolyte layer at the thin part.

7. A plate member according to claim 6, wherein
   the difference between the thickness of the solid electrolyte layer at the thick part and the thickness of the solid electrolyte layer at the thin part is not less than 10 μm and not more than 300 μm.

8. A plate member according to claim 5, wherein
   the thickness of the fuel electrode layer at the thick part is greater than the thickness of the fuel electrode layer at the thin part.

9. A plate member according to claim 8, wherein
   the difference between the thickness of the fuel electrode layer at the thick part and the thickness of the fuel electrode layer at the thin part is not less than 10 μm and not more than 300 μm.

10. A plate member according to claim 1, wherein
    the thin part is made by laminating a solid electrolyte layer serving as the ceramic layer, a fuel electrode layer formed on one surface of the solid electrolyte layer, and an air electrode layer formed on the other surface of the solid electrolyte layer, and
    the thick part is made by laminating a warp correction layer, which is a layer for reducing a warp on the plate member on the surface of a laminate member composed of the solid electrolyte layer, fuel electrode layer, and air electrode layer, which constitute the thin part.

11. A plate member according to claim 10, wherein
    a layer made of a material having a thermal expansion coefficient smaller than the thermal expansion coefficient of the solid electrolyte layer is laminated, as the warp correction layer, on the surface of the fuel electrode layer.

12. A plate member according to claim 11, wherein
    the thickness of each warp correction layer is not less than 10 μm and not more than 100 μm.

13. A plate member according to claim 10, wherein
a layer made of a material having a thermal expansion coefficient greater than the thermal expansion coefficient of the solid electrolyte layer is laminated, as the warp correction layer, on the surface of the air electrode layer.

14. A plate member according to claim 10, wherein
as the warp correction layer, a layer made of a material having a thermal expansion coefficient smaller than the thermal expansion coefficient of the solid electrolyte layer is laminated on the surface of the fuel electrode layer, and a layer made of a material having a thermal expansion coefficient greater than the thermal expansion coefficient of the solid electrolyte layer is laminated on the surface of the air electrode layer.

15. A plate member according to claim 10, wherein
a layer made of a material having a thermal expansion coefficient smaller than the thermal expansion coefficient of the fuel electrode layer is laminated, as the warp correction layer, on the surface of the fuel electrode layer.

16. A plate member according to claim 10, wherein
a layer made of a material having a thermal expansion coefficient greater than the thermal expansion coefficient of the air electrode layer is laminated, as the warp correction layer, on the surface of the air electrode layer.

17. A plate member according to claim 10, wherein
as the warp correction layer, a layer made of a material having a thermal expansion coefficient smaller than the thermal expansion coefficient of the fuel electrode layer is laminated on the surface of the fuel electrode layer, and a layer made of a material having a thermal expansion coefficient greater than the thermal expansion coefficient of the air electrode layer is laminated on the surface of the air electrode layer.

18. A plate member according to claim 1, wherein
the thin part is made by laminating a solid electrolyte layer serving as the ceramic layer, a fuel electrode layer formed on one surface of the solid electrolyte layer, and an air electrode layer formed on the other surface of the solid electrolyte layer, and
the thick part has a warp correction layer, which is a layer made of a material having a thermal expansion coefficient smaller than the thermal expansion coefficient of the solid electrolyte layer and for reducing a warp on the plate member caused by the difference in thermal expansion coefficient, embedded into the fuel electrode layer of a laminate member composed of the solid electrolyte layer, fuel electrode layer, and air electrode layer, which constitute the thin part.

19. A plate member according to claim 18, wherein
a second warp correction layer, which is made of a material having a thermal expansion coefficient greater than the thermal expansion coefficient of the solid electrolyte layer and is for reducing a warp on the plate member caused by the difference in thermal expansion coefficient, is laminated on the surface of the air electrode layer at the thick part.

20. A plate member according to claim 1, wherein
the thin part is made by laminating a solid electrolyte layer serving as the ceramic layer, a fuel electrode layer formed on one surface of the solid electrolyte layer, and an air electrode layer formed on the other surface of the solid electrolyte layer, and
the thick part has a warp correction layer, which is a layer made of a material having a thermal expansion coefficient smaller than the thermal expansion coefficient of the fuel electrode layer and for reducing a warp on the plate member caused by the difference in thermal expansion coefficient, embedded into the fuel electrode layer of a laminate member composed of the solid electrolyte layer, fuel electrode layer, and air electrode layer, which constitute the thin part.

21. A plate member according to claim 20, wherein
a second warp correction layer, which is made of a material having a thermal expansion coefficient greater than the thermal expansion coefficient of the air electrode layer and is for reducing a warp on the plate member caused by the difference in thermal expansion coefficient, is laminated on the surface of the air electrode layer at the thick part.

* * * * *